United States Patent
Szczepanik et al.

(10) Patent No.: US 11,119,980 B2
(45) Date of Patent: Sep. 14, 2021

(54) SELF-LEARNING OPERATIONAL DATABASE MANAGEMENT

(71) Applicant: International Business Machines Corporation, Armonk, NY (US)

(72) Inventors: Grzegorz P. Szczepanik, Cracow (PL); Krzysztof A. Rudek, Nowy Wisnicz (PL); Tomasz Hanusiak, Cracow (PL); Konrad W. Komnata, Cracow (PL)

(73) Assignee: International Business Machines Corporation, Armonk, NY (US)

(*) Notice: Subject to any disclaimer, the term of this patent is extended or adjusted under 35 U.S.C. 154(b) by 321 days.

(21) Appl. No.: 16/205,491

(22) Filed: Nov. 30, 2018

(65) Prior Publication Data
US 2020/0174966 A1 Jun. 4, 2020

(51) Int. Cl.
*G06F 16/20* (2019.01)
*G06F 16/13* (2019.01)
*G06F 16/11* (2019.01)

(52) U.S. Cl.
CPC .......... *G06F 16/13* (2019.01); *G06F 16/116* (2019.01)

(58) Field of Classification Search
CPC .............................. G06F 16/13; G06F 16/116
See application file for complete search history.

(56) References Cited

U.S. PATENT DOCUMENTS

| | | | |
|---|---|---|---|
| 9,229,952 B1* | 1/2016 | Meacham | G06F 16/1873 |
| 9,953,081 B2 | 4/2018 | Gomadam et al. | |
| 2011/0119481 A1* | 5/2011 | Auradkar | G06F 21/602 |
| | | | 713/150 |
| 2017/0060894 A1 | 3/2017 | Gorelik | |
| 2018/0095952 A1* | 4/2018 | Rehal | G06F 16/213 |
| 2018/0096000 A1* | 4/2018 | Harrison | G06F 16/254 |
| 2018/0276256 A1* | 9/2018 | Sarkar | G06N 20/00 |
| 2019/0130008 A1* | 5/2019 | Nakagoe | G06F 16/254 |

OTHER PUBLICATIONS

Khine et al., "Data lake: a new ideology in big data era", ITM Web of Conferences 17, 03025 (2018), WCSN 2017, © The Authors, published by EDP Sciences, 11 pages, <https://doi.org/10.1051/itmconf/20181703025>.
"Databases for the Data Lake", CITO Research, Data Science, © 2012 Evolved Media, Aug. 14, 2018, 3:10 PM, <https://www.citoresearch.com/data-science/databases-data-lake>.

* cited by examiner

*Primary Examiner* — Tarek Chbouki
(74) *Attorney, Agent, or Firm* — Christopher M. Pignato

(57) ABSTRACT

Systems, methods, tools and computer programming products for implementing a cognitive data lake that selects or recommends operational database based on historically created data lakes storing files having similar file types, categorizations, metadata, and/or frequency of file usage. Selecting the appropriate operational databases is streamlined by building a knowledge base that is accessible during the creation and/or registration of each data lake. The knowledge base maintains historical records of past data lakes, describing each historical data lake's file types, attributes, metadata, frequency of file usage and at least one operational database implemented to manage the files of the historical data lake. Incoming files streamed or stored by the data lake are analyzed for metadata (extracted from the files as well as separate metadata), categorized based on the metadata, and matched to one or more operational databases of the historical data lakes described by knowledge base, known to manage similar files.

20 Claims, 11 Drawing Sheets

SELF-LEARNING OPERATIONAL DATABASE MANAGEMENT

TECHNICAL FIELD

The present disclosure relates generally to the field of data management and storage, and more particularly to cognitive database management of a data lake.

BACKGROUND

A data lake is a data-centered architecture featuring a repository capable of storing vast quantities of data in various formats. Data from webserver logs, databases, social media, and third-party data is ingested into the data lake. Curation takes place through capturing metadata, making the data available in a data catalog. A data lake can hold data in an unstructured manner. There may not be a hierarchy or organization to the storage of individual pieces of data ingested into the data lake. The data held by the data lake is not processed or analyzed upon ingestion into the data lake. Instead, a data lake accepts and retains data from a plurality of data sources, supports a broad array of data types and applies a schema to the data once the data is ready to be used.

A data lake enables users and administrators to analyze a wide variety and volume of data stored in the data lake. Numerous features and functionalities maybe implemented to secure and curate the data, and then allow for users, administrators and data scientists to run analytics, visualization, and reporting on the data. Each data element in a data lake can be assigned a unique identifier and tagged with one or more relevant keywords. When a business question arises, the data lake can be queried for the relevant data being sought, retrieved and presented to the help answer the question being raised.

SUMMARY

A first embodiment of the present disclosure provides a computer-implemented method comprising the steps of categorizing a streaming file ingested by a data lake based on a metadata of the streaming file; associating an operational database with the data lake based on the categorized streaming file; and creating an entry in a knowledge base comprising a description of the data lake, the operational database associated with the data lake and the categorized streaming file.

A second embodiment of the present disclosure provides a computer system comprising a processor; and a computer-readable storage media coupled to the processor, wherein the computer readable storage media contains program instructions executing a computer-implemented method comprising the steps of: categorizing a streaming file ingested by a data lake based on a metadata of the streaming file; associating an operational database with the data lake based on the categorized streaming file; and creating an entry in a knowledge base comprising a description of the data lake, the operational database associated with the data lake and the categorized streaming file.

A third embodiment of the present disclosure provides a computer program product comprising: one or more computer readable storage media having computer-readable program instructions stored on the one or more computer readable storage media, said program instructions executes a computer-implemented method comprising the steps of: categorizing a streaming file ingested by a data lake based on metadata of the streaming file; associating an operational database with the data lake based on the categorized streaming file; and creating an entry in a knowledge base comprising a description of the data lake, the operational database associated with the data lake and the categorized streaming file.

BRIEF DESCRIPTION OF THE DRAWINGS

FIG. 5b is a continuation of the flow diagram describing the embodiment of the algorithm of FIG. 5a.

DETAILED DESCRIPTION

Overview

Figure 1A:
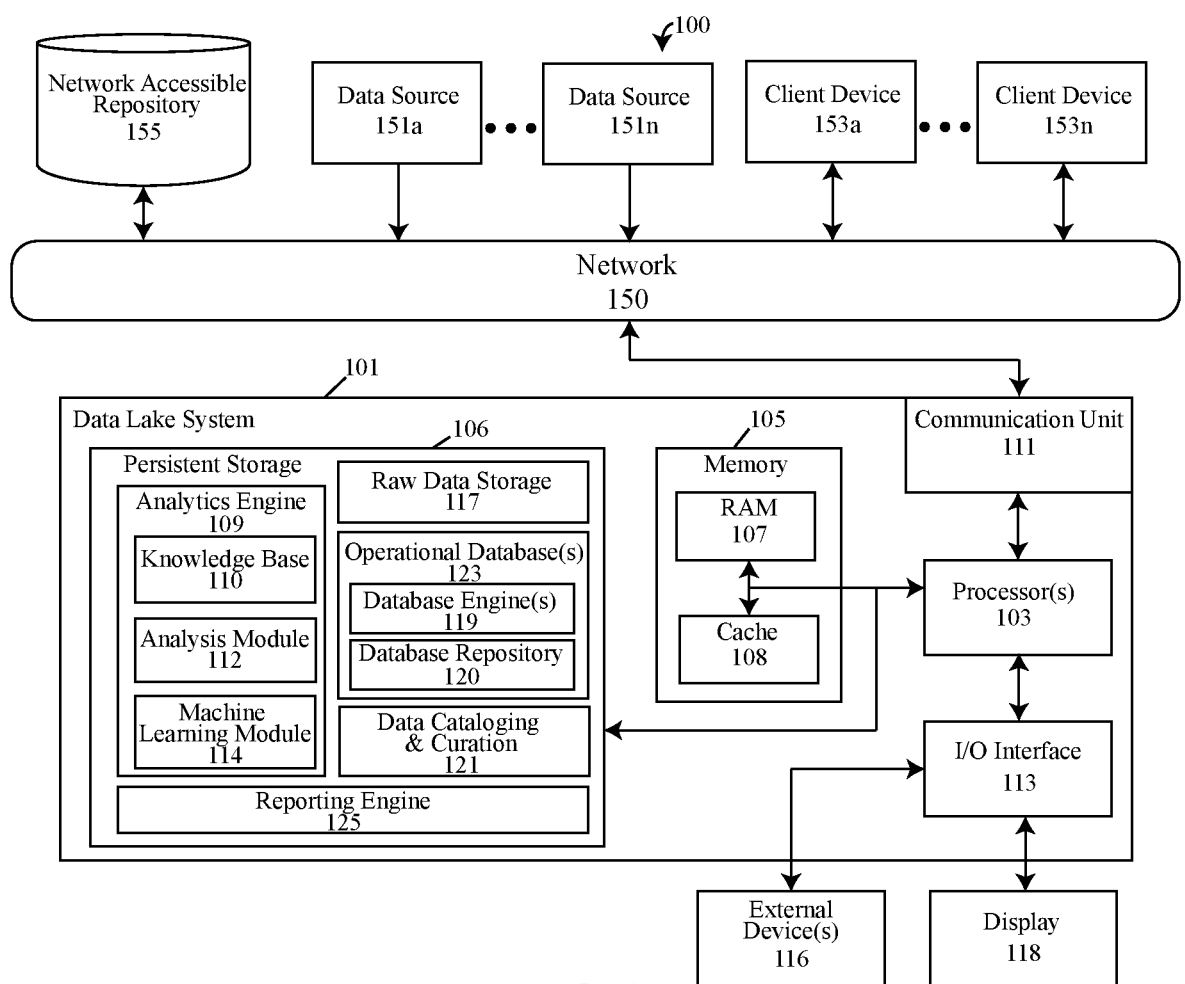
FIG. 1a depicts a functional block diagram describing an embodiment of a computing environment in accordance with the present disclosure.

Traditional data lake storage systems offer a repository that can store large amounts of structured, unstructured and semi-structured data. The data being stored is ingested into the data lake, where the ingested files may be stored in the file's native format rather than being immediately processed into a structured database. Currently available data lake systems 101 operate as a type of data warehouse, storing the ingested files for subsequent uploading, reading and analysis by users of the data lake system 101. To perform the operations of data warehousing, currently available data lakes often rely on the implementation of a flat file architecture, wherein every file ingested into the data lake may be given a unique identifier and may be tagged with one or more keywords, descriptors or other information that may be queried later, when users, administrators or other individuals are retrieving the stored data.

The embodiments of the current disclosure recognize that the implementation of an operational database 123 within a traditional data lake is typically performed manually by administrators and developers controlling the data lake. Data lake administrators typically make direct decisions regarding which types of operational database(s) 123 to use for the particular type of data being stored. Often, the amount of data being stored by the data lake may be too voluminous for a manual examination of the data and determination by an administrator regarding which type of operational database(s) 123 to employ. Embodiments of the present disclosure recognize that when building a data lake, the schemas applied to the data, by the database engine(s) 119 of the operational database(s) 123 during downstream data lake operations, may not be implemented or defined until the data is queried by the data lake's users, administrators, developers and data scientists for further action or processing.

Embodiments of the present disclosure improve upon existing data lake systems 101 by implementing cognitive, self-learning methods to data lakes, recommending and selecting one or more operational databases 123 that may apply data management solutions to the data being ingested by the data lake system 101. The operational database 123 selections and recommendations may be based on historical data describing historically implemented operational databases 123 applied to previous data lakes storing files having similar data types, data content, file types, metadata, structure (or lack thereof) and file usage patterns (i.e. the kind and frequency of similar data usage) (referred herein as "data classification").

Embodiments of the systems, methods, program products and tools described herein may solve problems associated with data lake creation, registration, data transformation, management, analysis and downstream processing. Specifically, embodiments of the present disclosure may streamline and improve the efficiency of accessing and transforming data from the native file formats ingested by the data lake to structured datasets maintained by the operational database(s) 123 of the data lake system 101. Improvements in the efficiency of the data lake storage and operations enacted upon the stored data may be achieved by building a knowledge base 110 that may be accessible to the data lake systems 101 or other computing systems of the computing environment 100, 180, 190, 200, 280, 350 during the creation, registration or building of the data lake. Embodiments of the knowledge base 110 may be built using historical data describing existing data lakes that have already been used in the past, including descriptions of files managed, categorizations of the files and data being stored by the historical data lakes, the types of operational databases 123 implemented, performance of the database engines 119 employed to manage the stored files and frequency of specific file types accessed within a historical data lake system.

Embodiments of data lake systems 101 described herein may generate a file list describing each file being streamed to the data lake or stored by the data lake. One or more tools may be used to inspect and analyze the stream of incoming files and/or analyze each of the files currently stored by the data lake. In particular, the tools may analyze the files for metadata or separate metadata files which may be associated with the files being analyzed. The term "metadata" may refer to data that describes the file's data being streamed or stored by the data lake. The metadata may be embedded within the files being analyzed in some embodiments, or in other embodiments, the metadata may be ingested into the data lake as a separate metadata file which may include a pointer or other methods for associating metadata files with the files ingested by the data lake.

The files entered into the file list may be categorized based on the analysis of the metadata. Metadata may provide clues about the type of information being stored by and/or streamed to the data lake system 101. For example, an image or video may include metadata that describes the size of the image or video, the color depth, resolution, date of creation, video length, etc. A text document's metadata may comprise information about how long a document is, the author's name, date the document was written and/or last revised and a short-written summary of the document (which may be tagged with one or more keywords). In another example, metadata may store log files that monitor and log interactions about or between certain computer systems. For instance, cell phone metadata may describe information such as location data, incoming or outgoing calls, the telephone numbers of the calls, length of call time, etc. An XML document's metadata may comprise markup that describes the document, including library names, routines, elements of the document, table headings, subheadings, captions, and footers. Moreover, XML documents, Web pages, and HTML documents may comprise metatags, which may be placed in the header of these documents. A metatag may include keywords and descriptors of the file associated with the metadata and provide a means for understanding or categorizing the data within the file, even without viewing the file itself.

Embodiments of the data lake system 101 may detect the presence of one or more existing operational database(s) 123 and may do so based on the types of database engines 119 being utilized. Based on the type of operational database being used, one or more correlations between the types of files and data stored by or streamed to the data lake and the operational database 123 which has been implemented. Embodiments of the knowledge base 110 may describe the types of files and data stored by each historically created data lake and the one or more operational databases 123 provisioned thereto to handle each type of file being received and/or stored. As new data lakes are created or request registration, embodiments of the data lake system 101 may analyze the incoming streams of files being transmitted to the data lake for metadata (either within the file itself or as a separate metadata file), categorize the file, the file data, file attributes (including file-type and the type of data stored) and other file or data characteristics based on the analyzed metadata.

The generated file list categorizing each file being transmitted to the data lake system 101 may be compared with the information stored by the knowledge base 110 to determine which operational database(s) 123 may be best suited for handling the types of data being received and stored. The data lake system 101 may query the knowledge base 110 for records describing previously created and/or existing data lakes. The data lake system 101 may apply one or more analytics tools, cognitive learning techniques or algorithms, such as machine learning and/or data clustering, to ascertain which historical data lakes have implemented a data lake having the closest correlation with the files being received or stored by the data lake being created or registered and the optimal database engine 119 for reading, writing and updating the files.

In some embodiments of the data lake system, a single operational database 123 may be used. For example, when there may only be a single type or classification of data being stored by the data lake system 101, and therefore only a single operational database 123 and database engine 119 best suited to manage the data may be needed. In other embodiments, a data lake system 101 may be managing a plurality of different types of file types and data categories. Under such circumstances, more than one operational database 123 may be needed to manage the different file types and data categories and thus the data lake system 101 may consult the knowledge base 110 to identify an operational database 123 to manage each file type or category of data being stored based on one or more of the historical data lakes that have historically managed the same types of files and data.

Embodiments of the data lake system 101 may select one or more operational databases 123 employing a database engine 119 and an organizational schema that may have been used by one or more historically created data lakes which most closely resembles the category of data being stored by the data lake being created or registered. Embodiments of the data lake system 101 may either recommend a specific type of operational database 123 to an administrator of the data lake and/or automatically provision the data lake with the same type of operational database(s) 123 and database engine(s) 119 as the most closely related historical data lakes recorded in the knowledge base 110.

Moreover, when embodiments of the data lake system 101 described herein are requested to provide access to natively stored data, the data lake system 101 may identify the data requested in the data's native form and transform the data by applying the schema of the selected operational database(s) 123 to the natively stored data, resulting in the creation of a structured dataset that may be queried, analyzed, processed and reported to one or more users of the new data lake upon request. Embodiments of the data lake systems 101 described herein may further employ a graphical user interface (GUI) to represent and report data being queried by the user, administrator or data scientist operating the data lake. The GUI may display a visual representation of the data that had been transformed into the structured dataset, allowing for further manipulation, processing and presentation of the data accessible via the data lake system 101.

System for Self Learning Operational Database Management

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIGS. 1a-4 depict diagrams of a computing environment 100, 180, 190, 200, 280, 350, capable of recommending and/or provisioning an operational database 123 to a data lake, and/or sorting incoming files to a data lake having an operational database 123 best suited for managing the files, in accordance with the embodiments of the present disclosure. Embodiments of computing environment 100, 180, 190, 200, 280, 350 may include a plurality of computer systems and devices interconnected via a computer network 150, such as a data lake system 101a, 101b . . . 101n (referred herein referred to individually or plurally as "data lake system 101"), analytics system 130, a plurality of client devices 153a . . . 153n (hereinafter referenced collectively as "client device 153"), network accessible hardware such as a network accessible repository 155, and one or more computer systems maintaining a data source 151a . . . 151n (hereinafter referenced collectively as "data source 151") capable of streaming structured data, semi-structured data and unstructured data to the data lake system 101. As shown in FIGS. 1a-4 the number of data lake systems 101, data sources 151, client devices 153, operational databases 123a, 123b, 123c, 123d, 123e . . . 123n (referred to generally as "operational databases 123"), database engines 119a, 119b, 119c, 119d, 119e . . . 119n (referred to generally as database engines 119) and database repository 120a, 120b, 120c, 120e . . . 120n (referred to generally as database repository 120) may not be limited to the number depicted in the drawings. The number of data lake systems 101, data sources 151, client devices 153, operational databases 123, database engines 119 and database repositories 120 may be any number supported by network 150, wherein data lake system 101n, data source 151n, client device 153n, operational database 123n, database engine 119n and database repository 120n may identifies the last data lake system 101, data source 151, client device 153, operational database 123, database engine 119 and/or database repository 120 in a plurality thereof connected to network 150 and not necessarily the second, third, fourth, etc., data lake system 101, data source 151, client device 153, operational database 123, database engine 119, or database repository 120 shown explicitly in the drawings.

Figure 6:
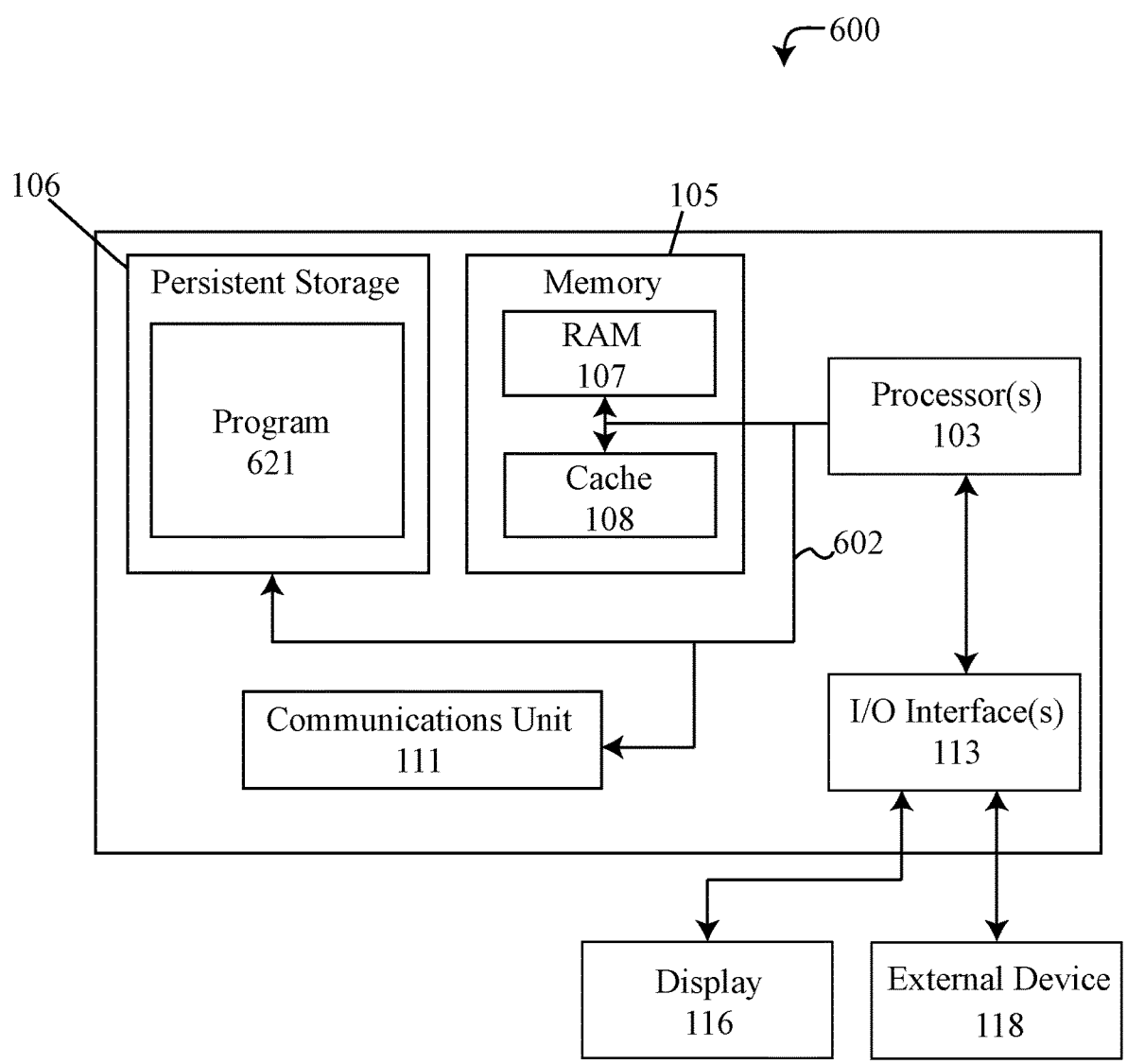
FIG. 6 depicts an embodiment of a block diagram of internal and external components of a computer system in accordance with the embodiments of the present disclosure.

Data lake system 101, analytic system 130, data source 151, client device 153 and network accessible systems such as network accessible repository 155, may each be a specialized computer system comprising specialized configurations of hardware, software or a combination thereof as shown and described in FIGS. 1a-4 of the present disclosure and in embodiments described herein. Embodiments of the data lake system 101, analytic system 130, data source 151, client device 153 and network accessible repository 155, may not only comprise the elements of the systems and devices depicted in FIGS. 1a-4, but may also incorporate one or more elements of a computer system 600, as shown in FIG. 6 and described in the COMPUTER SYSTEM section detailed below. One or more elements of the computer system 600 may be integrated into the specialized computer systems of computing environment 100, 180, 190, 200, 280, 350, including the data lake system 101, analytic system 130, data source 151, client device 153 and other network accessible systems.

Embodiments of the data lake system 101, analytic system 130, data source 151, client device 153 and other network accessible systems may be desktop computers, laptop computers, tablet computers, smartphones, server computers, or any other computer system known in the art. In some embodiments, data lake system 101, analytic system 130, data source 151, client device 153 and other network accessible systems, may represent computer systems utilizing clustered computers and components to act as a single pool of seamless resources when accessed through network 150. For example, such embodiments may be used in data center, cloud computing, storage area network (SAN), and network attached storage (NAS) applications. In certain embodiments, the data lake system 101, analytic system 130, data source 151, client device 153 and other network accessible systems may represent virtual machines provisioned by a host computer on the network 150. For example, data lake system 101 may host a plurality of virtual machines accessing one or more data sets stored by the data lake system 101. In general, data lake system 101, analytic system 130, data source 151, client device 153 and other network accessible systems may be representative of any electronic devices, or combination of electronic devices, capable of executing machine-readable program instructions, as described in greater detail with regard to FIGS. 5a-5c.

Embodiments of the data lake system 101, analytic system 130, data source 151, client device 153 and other network accessible systems such as network repository 155, may each be connected and placed into communication with one another over a computer network 150. Embodiments of the computer network 150 may be constructed using wired, wireless or fiber optic connections. As shown in the exemplary embodiments, the data lake system 101, analytic system 130, data source 151, client device 153 and other network accessible systems may connect and communicate over the network 150 using a communication unit 111, such as a network interface controller or other network communication hardware. Embodiments of the communication unit 111 may implement specialized electronic circuitry allowing for communication using a specific physical layer and a data link layer standard. For example, Ethernet, Fiber channel, Wi-Fi or Token Ring. Communication unit 111 may further allow for a full network protocol stack, enabling communication over network 150 to the group of computer systems or other computing hardware devices linked together through communication channels. The network 150 may facilitate communication and resource sharing among data lake systems 101, analytic system 130, client devices 153 and other network accessible systems connected to the network 150, for example network accessible storage media and network accessible repository 155. Examples of network 150 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing is a model of service delivery for enabling convenient, on-demand network 150 access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
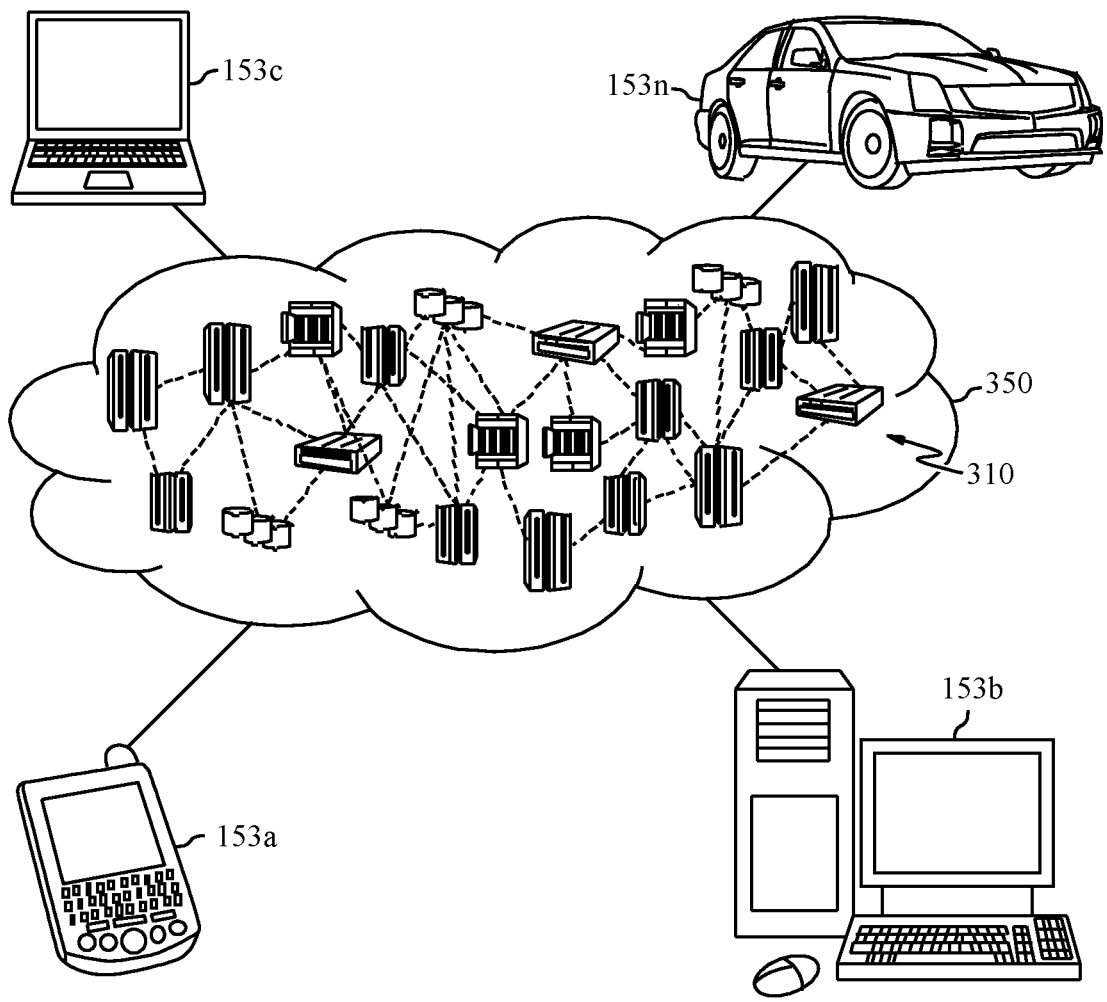
FIG. 3 depicts an embodiment of a cloud computing environment in accordance with the present disclosure.

Referring to the drawings, FIG. 3 is an illustrative example of a cloud computing environment 350. As shown, cloud computing environment 350 includes one or more cloud computing nodes 310 with which local client devices 153 used by cloud consumers, such as, for example, smart-phone or cellular telephone 153a, desktop computer 153b, laptop computer 153c, and/or any other computing device such as an automobile computer system 153n, may communicate. Nodes 310 may communicate with one another and may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of client devices 153 shown in FIG. 3 are intended to be illustrative only and that computing nodes 310 and cloud computing environment 350 can communicate with any type of computerized device over any type of network and/or network addressable connection (e.g., using a web browser).

Figure 4:
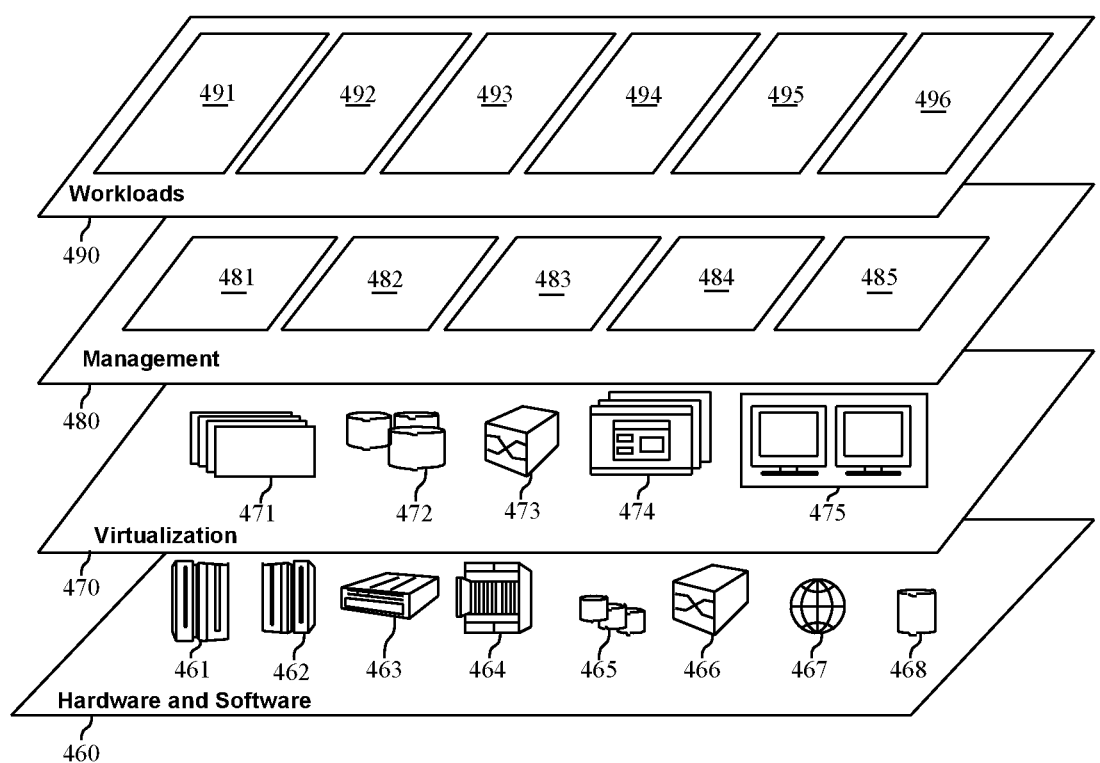
FIG. 4 depicts an embodiment of abstraction model layers of a cloud computing environment in accordance with the present disclosure.

Referring now to FIG. 4, a set of functional abstraction layers provided by cloud computing environment 350 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 350. Metering and pricing 482 provide cost tracking as resources are utilized within the cloud computing environment 350, and billing or invoicing for consumption of these resources. In one example, these resources can include application software licenses. Security provides identity verification for cloud consumers and tasks, as well as protection for data and other resources. User portal 483 provides access to the cloud computing environment 350 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: machine learning 491; software development and lifecycle management 492; data curation 493; data analytics processing 494; report processing 495 and operational database management 496.

Embodiments of the data lake system 101 may include one or more processes, services, engines and/or modules specializing in performing one or more specific tasks associated with creating, maintaining and providing access to the information stored by a data lake. The term "module" may refer to a hardware module, software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 105 devices and/or persistent storage 106. A software-based module may be part of a program 621, program code or linked to program code containing specific programmed instructions loaded into a memory 105 device or persistent storage 106 device of a computer system operating in computing environment 100, 180, 190, 200, 280, 350.

Embodiments of the computing environments 100, 180, 190, 200, 280, 350, including one or more systems, subsystems, processes, services, engines and/or modules, whether hardware, software, or a combination thereof, may perform the functions and tasks associated with the creation, management, processing, accessibility and presentation of data stored by one or more data lake systems 101. More specifically, embodiments of the data lake system 101 operating within a computing environment 100, 180, 190, 200, 280, 350, may perform the functions associated with ingesting at least one streaming file from one or more data streams 203, 205, 207 into the data lake, storing the streaming files in an unprocessed, native format, scanning metadata associated with the streaming files (either embedded within the file or as a separate metadata file), analyzing the metadata, categorizing the content of the streaming files using the metadata and one or more machine learning techniques, and generating a list of the files entering or being stored by the data lake system 101. Additional functions of the data lake system 101 may include creating or updating a knowledge base 110 and querying said knowledge base 110 in order to identify one or more operational databases 123 that may utilize a database engine 119 that may be best suited for managing and processing the raw data stored in native format by transforming the data into a structured format that may be suitable for further processing and presentation by the data lake system 101 to users, administrators and data scientists accessing the data lake.

Referring to the drawings, FIG. 1a depicts an exemplary embodiment of computing environment 100, which may include a data lake system 101 as shown. Embodiments of the data lake system 101 may include a plurality of components, modules, services, engine and programs, which may be integrated into the data lake system 101. Examples of these components, modules, services, engines and programs may include an analytics engine 109, raw data storage 117, cataloging & curation 121 module, one or more operational databases 123 and/or a reporting engine 125.

Embodiments of the raw data storage 117 may be described as a persistent storage 106 device, memory 105 device, a separate storage sub-device or virtualized device. As shown in FIG. 1a, the raw data storage 117 is shown as a sub-section of persistent storage 106. Embodiments of the raw data storage 117 may be any physical hardware, software, or virtualized device capable of performing the task or function of saving and storing one or more files received by a data lake system 101. Embodiments of the raw data storage 117 may maintain each file received, in the native form and/or format the file is received. Embodiments of the files received may be stored without further processing of the file in some data lake systems 101.

In some embodiments, the files ingested into the data lake system 101 and being stored by the raw data storage 117, may be managed using a flat file architecture to track and maintain each of the files without having to apply a structure or schema to the raw data storage 117 at the time of file ingestion. For example, each file being stored by the raw data storage 117 can be assigned a unique identifier. In some instances, each file entering the data lake system 101 may also be tagged with a set of metadata tags further describing the type of data being stored to the raw data storage 117 as well as the content of the file being ingested. The file being received may be ingested with metadata that may already be pre-tagged with keywords and descriptors in some embodiments. For example, a header in a file describing a treatment for cancer research may be tagged with keywords such as "cancer", "melanoma", "chemotherapy", etc. In other embodiments, the metadata may be extracted from the file based on the properties of the file. In alternative embodiments, the files entering the raw data storage 117 may be analyzed for the content and/or metadata by the data lake system 101 for keywords and descriptions that may be present within the file. For example, a scan of the metadata file of a file entering the data lake system 101 may reveal certain words being repeatedly used throughout the metadata, more than a particular number of times prescribed. For example, a text file's metadata may include headers for an experimental results tables repeatedly using the words cancer, melanoma and chemotherapy a plurality of times throughout the metadata. Accordingly, due to the repetitive number of uses that may be identified by an analytics module 112 scanning the metadata, the data lake system 101 may add one or more metatags to the file for cancer, chemotherapy and melanoma based on the inclusion of these words repeatedly being identified in the metadata of the file or a separate metadata file associated with the file being stored.

One or more files being received and stored by the raw data storage 117 may be transmitted to the data lake system 101 from one or more data sources 151 via network 150. The term "data source" may refer to an originating location of a file and the accompanying metadata, that is transmitted to the data lake system 101 and subsequently ingested by the data lake system 101. Examples of a data source 151 can include remote computer systems, servers, web sites, social media, mobile applications and hardware devices such as input devices and sensor devices recording or creating measurement data. The data of each file may be transmitted to the data lake systems 101 in discrete data packets or by streaming the file data over network 150 and storing the streaming files to the raw data storage 117.

Figure 2A:
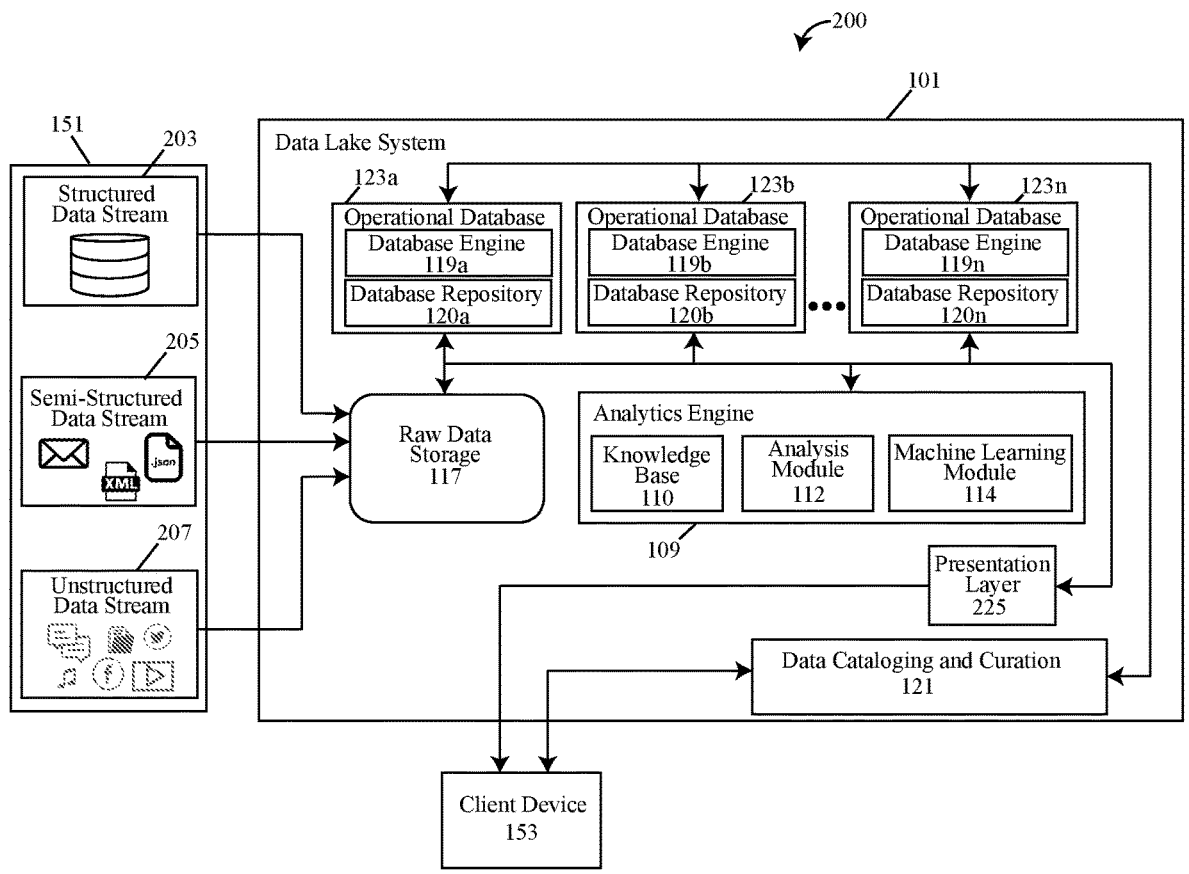
FIG. 2a depicts a functional block diagram describing a workflow for an embodiment of a computer environment, in accordance with the present disclosure.

In FIG. 2*a* of the drawings, an example of data streams 203, 205, 207 transmitting files from one or more data sources 151 is depicted. Embodiments of the data streams 203, 205, 207 may be streaming structured data via structured data stream 203, semi-structured data via semi-structured data stream 205 and/or unstructured data via unstructured data stream 207. The term "structured data" may refer to data that has been organized into a formatted repository, such as a database, allowing for one or more elements of the data to be made addressable and render analysis or processing of the data more efficient and effective. Structured data may be more easily searchable by simple search engines and algorithms. Examples of structured data can be data organized into database tables written using structured query language (SQL), including sensor data which may comprise one or more measurements, radio frequency ID tags, smart meter readings, medical device readings, global positioning system (GPS) data, inventory management, web log data, point of sale data, input data (name, age, questionnaire responses) and/or click-stream data.

The term "unstructured data" may refer to data that has not been formatted to fit within a conventional data model. Embodiments of unstructured data can be maintained in formats that are not uniform or standardized and may include text and/or multimedia content. Examples of unstructured data can include log files from websites, servers, networks and applications. Additional examples can include word processing documents, internet of things (IOT) devices, web pages, audio files, video files, images, machine data and presentations. While some of the unstructured data may have some internal structure, files may still be considered unstructured because the data contained by the file may not fit neatly into a database. Embodiments of "semi-structured data" on the other hand may be a type of data that contains semantic tags but may not conform to the structure associated with standard databases and may have a lack of a rigid schema found in structured data. Examples of semi-structured data may include extensible markup language (XML), hypertext markup language (HTML), Excel spreadsheets, JavaScript Object Notation (JSON) files, comma-separated value (CSV) files, archived files, DataStage files and some types of email messages.

Embodiments of the data lake system 101 may comprise an analytics engine 109. Embodiments of the analytics engine 109 may perform numerous functions or tasks on the data stored by the data lake system 101, including one or more functions on data stored by the raw data storage 117. Embodiments of the analytics engine 109 may incorporate the use of mathematics, statistics, predictive modeling and machine learning techniques to find meaningful patterns in the data stored by the raw data storage 117. More specifically, the analytics engine 109 may perform the functions of analyzing the types of data being ingested into the data lake system 101, categorizing the types of data being ingested, applying one or more machine learning techniques to discover and/or determine a correlation between the categories of data being ingested by the data lake system 101 with the type of operational database 123 being implemented by the data lake system 101 and building a knowledge base 110 capable of assisting with the decision-making being applied to subsequently created or registered data lakes.

Figure 1B:
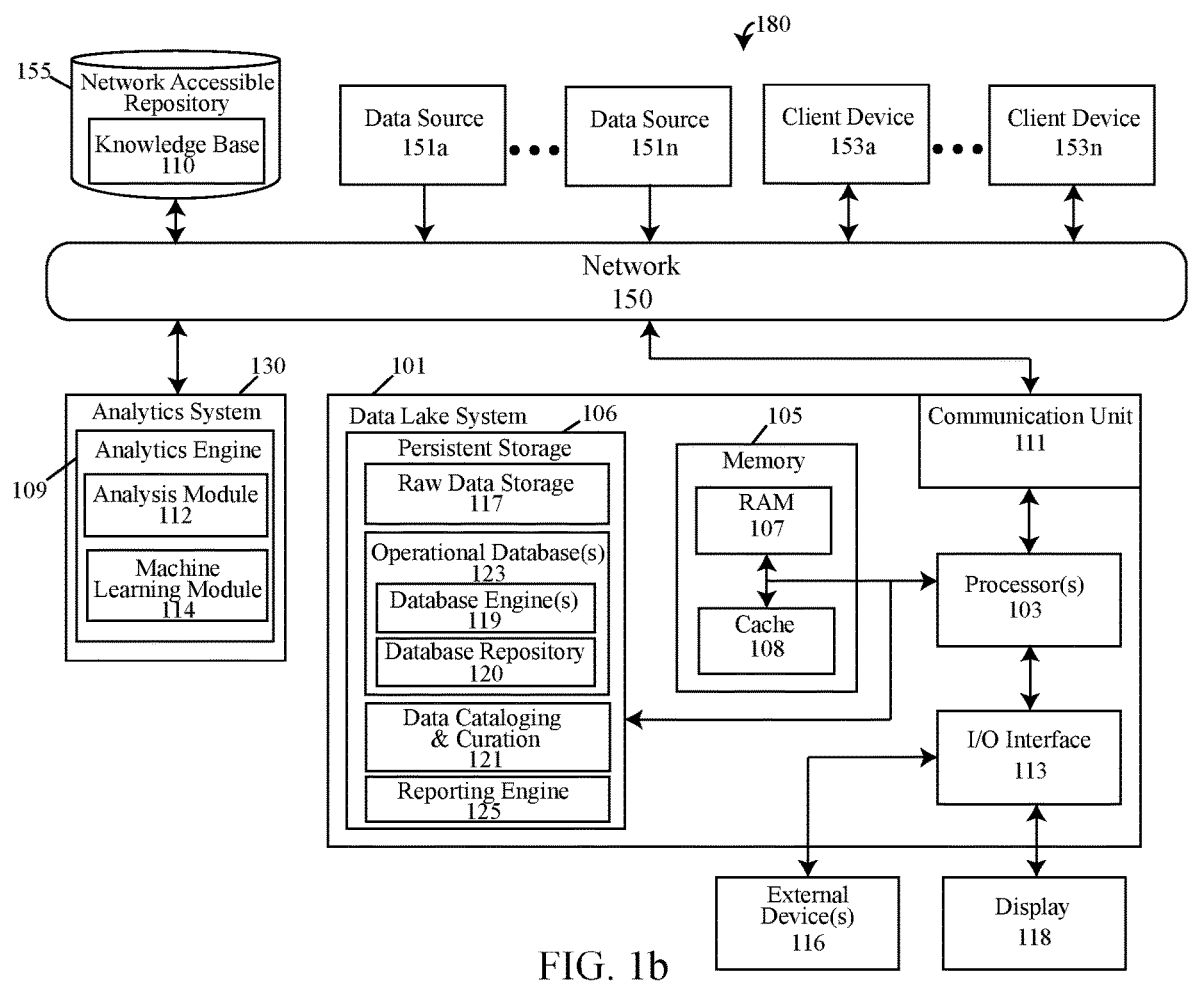
FIG. 1b depicts a functional block diagram describing an alternative embodiment of a computing environment in accordance with the present disclosure.

Embodiments of the knowledge base 110 may be a software application integrated into the analytics engine 109 or a standalone set of tools such as a customer relationship management (CRM) tool which may be stored directly on the persistent storage 106 of the data lake system 101, as shown in FIG. 1*a*. In alternative embodiments, the knowledge base 110 may be accessible remotely by the data lake system 101 over network 150. For example, by installing the knowledge base 110 on a network accessible repository 155 or remotely accessible server as shown in FIG. 1*b*.

Embodiments of the analytics engine 109 may comprise one or more components, services and/or modules which may assist with performing one or more tasks of the analytics engine 109. For example, in some embodiments of the analytics engine 109, the analytics engine 109 may comprise a knowledge base 110, an analysis module 112 and/or a machine learning module 114. The term "knowledge base 110" may refer to a human readable or machine-readable resource for disseminating and optimizing information collection, organization and retrieval. The knowledge base 110 may draw upon the knowledge of humans and artificial intelligence, that has been inputted into the knowledge base 110 in a machine-readable form and may be structured as a database. Embodiments of the knowledge base 110 may be used to find solutions to current and future problems by using the data inputted into the knowledge base 110 from past experiences to make informed decisions and/or recommendations to a user or administrator of the data lake system 101. Embodiments of the knowledge base 110 may not be simply a static collection of information. Rather, the knowledge base 110 may be a dynamic resource having the cognitive capacity for self-learning, using one or more data modeling techniques and/or by working in conjunction with one or more machine learning programs stored by the machine learning module 114 to improve recognition of data and file classifications as well as recognizing the best operational databases 123 to implement, comprising the most optimized database engines 119 for managing the identified data and file classifications being stored. Embodiments of the knowledge base 110 may apply problem solving logic and use one or more problem solving methods to provide a justification for conclusions reached by the knowledge base 110 when recommending the provisioning of one or more operational databases 123 to a data lake system 101.

The knowledge base 110, of the exemplary embodiment, may be a machine-readable knowledge base 110 that may receive, and store information inputted into the knowledge base 110 as one or more database records. The content of each database record may include information describing historical data lakes that have been previously created or registered, the type of data stored by the historical data lakes (i.e. JSON, CSV, .txt, XML, HTML, etc.), the frequency with which one or more types of data or files are accessed within the historical data lake, and one or more associated operational databases 123 comprising database engines 119 capable of applying a particular schema to the files of the raw data storage 117. Schemas of the operational databases 123 implemented by the database engines 119 may control how files from the raw data storage 117 may be processed upon subsequently being queried by a user or administrator of the data lake system 101.

Embodiments of the knowledge base 110 may further comprise information describing one or more optimal database engines 119 for a particular classification or type of data that may be stored by a data lake system 101. The analytics engine 109 may test the operations of one or database engines 119 applied to the operational databases 123 of historically created data lakes. For example, the analytics engine 109 may employ an AI algorithm focused on read/write operations of database engines 119. The analytics engine 109 may test the read/write operations of the historical data lakes, while focusing on reading and writing various types of data and files to the historical data lakes and measuring the performance of the operations. As a result of testing the read/write operation capacity of various database engines 119 to handle specific types of files and data, the analytics engine 109 can determine which database engines 119 may handle specific data types more optimally than others and enter the findings of the operations testing in the knowledge base 110 for each data lake record.

While some database engines 119 may overlap in the types of files and data that the respective database engines 119 may be able to process, the analytics engine 109 may determine whether a particular type of database engine 119 may perform operations better or more efficiently for specific types of files or data and log the information describing the read/write operation optimization of the database engines 119 within the knowledge base 110. When subsequently analyzing a newly created or registered data lake for the most suitable operational database 123, the analytics engine 109 may further consider the results of the read/write operations testing of the database engines 119 of comparable operational databases 123 before making a suggestion. The analytics engine 109 may periodically re-test the database engines 119 of historically created data lakes and update the results in the knowledge base 110.

Entries of the knowledge base 110 describing historically created data lakes may further describe how frequently specific types of files may be accessed. The analytics engine 109 may monitor the data of these historical data lakes to determine how often the data lake's system services use a given file or file type. For example, by retrieving and analyzing file usage logs maintained by the historical data lake. The monitoring may be performed periodically or continuously in some embodiments. The analytics engine 109 may update the records of the knowledge base 110 based on the data monitoring of the historical data lakes, to reflect how often each of the historical data lakes may access certain file types. The frequency of data access by a historical data lake may make one type of historical data lake more favorable to emulate over another. For example, choosing to set up a new data lake storing XML documents to use the same type of operational database 123 implemented by a first historical data lake that frequently manages/accesses XML files rather than a different operational database of a second historical data lake that rarely manages/accesses XML files.

Embodiments of the knowledge base 110 may be queried by the data lake system 101 for the purposes of determining which type of operational databases 123 should be applied or suggested for a newly created or registered data lake. The knowledge base 110 may perform automated deductive reasoning, machine learning or a combination of processes thereof in response to the query to narrow down the information stored by the knowledge base 110 to arrive at a solution suggesting one or more operational databases 123 to provision to newly created or registered data lakes.

Embodiments of a knowledge base 110 may comprise a plurality of components to operate and make decisions that may be useful to users and administrators of a data lake for selecting one or more operational databases 123. Embodiments of the knowledge base 110 may include components such as a fact database, rules engine, a reasoning engine, a justification mechanism and a knowledge acquisition mechanism. The facts database may contain the knowledge base's 110 current fact pattern of a particular situation, which may comprise data describing a set of observations about a current data lake being created or registered. For example, facts describing the types of files being streamed to and/or stored by the raw data storage 117 of the data lake, the frequency of use of these file types by the data lake and the kinds of data being stored within the files based on the analysis of the metadata embedded within the files or accompanying each file as a separate metadata file.

Embodiments of the rules engine of a knowledge base 110 may be a set of universally applicable rules that may be created based on the experience and knowledge of the practices of experts, developers, programmers and/or contributors to the knowledge base 110. The rules created by the rules engine may be generally articulated in the form of if-then statements or in a format that may be converted to an if-then statement. The rules of the knowledge base 110 may be fixed in such a manner that the rules may be relevant to all or nearly all situations covered by the knowledge base 110. While not all rules may be applicable to every situation being analyzed by the knowledge base 110, where a rule is applicable, the rule may be universally applicable.

Embodiments of the reasoning engine of the knowledge base 110 may provide a machine-based line of reasoning for solving problems, such as deciding which operational database(s) 123 and/or database engine(s) 119 may provide the best solution to manage a newly created or registered data lake. The reasoning engine may process the facts in the fact database and the rules of the knowledge base 110. In some embodiments of the knowledge base 110, the reasoning engine may also include an inference engine which may take existing information in the knowledge base 110 and the fact database, then use both sets of information to reach one or more conclusions and/or implement an action. Embodiments of the inference engine may derive new facts from the existing facts of the facts database using rules and principles of logic.

Embodiments of the justification mechanism of the knowledge base 110 may explain and/or justify how a conclusion by the knowledge base 110 was reached. The justification mechanism may describe the facts and rules that were used to reach the conclusion. Embodiments of the justification mechanism may be the result of processing the facts of a current situation in accordance with the entries of the knowledge base 110, the reasoning engine, the rules and the inferences drawn by the knowledge base 110. The knowledge acquisition mechanism of the knowledge base 110 may be performed by a manual creation of the rules, a machine-based process for generating rules or a combination thereof.

In some embodiments of a data lake system 101, the analytics engine 109 may comprise an analysis module 112, which may operate alongside the knowledge base 110 and/or be integrated into one or more tools of the knowledge base 110, to perform the task or function of acquiring knowledge that may be entered into the knowledge base 110. Embodiments of the analysis module 112 may perform multiple functions when analyzing files entering or stored by a data lake system 101. Embodiments of the analysis module 112 may recognize and classify data by identifying the type of data being received and stored. For example, by analyzing the file type or file extension to differentiate data types. For example, the analysis module 112 may recognize the difference characteristics between files such as archived files (.zip, .tar, tar.gz and .7z), JSON, Csv, .txt, XML, HTML and DataStage files, just from the file extensions in the file name.

Moreover, the analysis module 112 may further classify the data and files being stored by the data lake system by analyzing and extracting metadata associated with each file streamed to the data lake system 101 and/or stored by the raw data storage 117. This metadata may be embedded within each file in some embodiments. For instance, as metatag keywords and descriptions, one or more tagged words or phrases within a file, headers or footers, properties or attributes describing the file. Other types of metadata may be analyzed in the form of metadata files, which may be separate from the files themselves comprising the actual data. The analysis module 112 may extract pre-defined metadata that may accompany the file (i.e. embedded within the file or as a separate metadata file) in some embodiments, or the analysis module 112 may extract characteristics of the data from the files as metadata using one or more AI algorithms. For example, text mining for generation of side information and named entity recognition algorithms.

Each file type and/or any associated metadata being analyzed may have a distinct, recognizable pattern of attributes within the metadata that may be helpful for categorizing the type of data stored by each file without having to process the entire file. For example, while analyzing the metadata of the files, the analysis module 112 can identify timestamp information associated with the file, image resolution, color depth, date of creation, geolocation, or other distinct information. Information such as this type of metadata may help categorize the file being analyzed by the analysis module 112 as an image or video file. Files such as web pages may be tagged with HTML metatags, which may describe a web page's content and one or more associated keywords for a search engine that may be indexing the web page. The analysis module 112 may parse through the metatags and identifying the presence of the metatags may act as evidence that the file being scanned may be a web page. In another example, the analysis module 112 can identify that there is a hierarchical structure to the file information being streamed or stored to the data lake system 101. The analysis module 112 may note or tag each of the identifying features of the metadata allowing for additional components of the analytics engine 109, such as the machine learning module 114 to categorize the data being ingested by the data lake system 101 in accordance with the discovered metadata analyzed by the analysis module 112.

Embodiments of the analysis module 112 may further perform the function of generating a file list describing each file being streamed to or stored by the raw data storage 117 of the data lake system 101. Embodiments of the file list being generated may include one or more properties or pieces of identifying information about each file listed. For example, the file list can include a file name, a unique ID applied to each file that is saved to the raw data storage 117 as part of the flat file architecture of the raw data storage 117, the file type, a description of the metadata analyzed by the analysis module 112 and/or the frequency of usage by the data lake system 101. Categorizations and/or classifications of each file may be determined based on the analysis of each file being stored or streamed to the raw data storage 117 and entered into the generated file.

In some embodiments of the analytics engine 109, a machine learning module 114 may be utilized to apply one or more machine learning techniques to the file list generated by the analysis module 112, to classify and categorize each file listed in the file list. Machine learning may refer to a method of data analysis that may automate analytical model building, allowing for computer systems such as data lake system 101 to learn from the metadata analyzed by analysis module 112 and past instances of file histories (i.e. historical data lakes) having similar properties to the analyzed files, in order to identify patterns and make decisions about the categorization of each file, with minimal intervention by a human user and/or administrator. In alternative embodiments of data lake system 101, the analytics engine 109 may incorporate techniques of data mining, deep learning and data clustering techniques to supplement and/or replace machine learning techniques that may be applied to the data by the machine learning module 114.

Embodiments of the machine learning techniques that may be implemented by the machine learning module 114 to categorize each of the files analyzed by the analysis module 112, may include supervised learning, unsupervised learning and/or semi-supervised learning techniques. Supervised learning is a type of machine learning that may use one or more computer algorithms to train the machine learning module 114 using labelled examples during a training phase. The term labelled example, may refer to the fact that during the training phase, there are desired inputs that will produce a known desired output by the machine learning module 114. The algorithm of the machine learning module 114 may be trained by receiving a set of inputs along with the corresponding correct outputs. To employ supervised learning, the machine learning module 114 may store a labelled dataset for learning, a dataset for testing and a final dataset from which the machine learning module 114 may use for making suggestions or predictions about the files and data that has been analyzed by the analysis module 112.

The algorithm may learn by comparing the actual output with the correct outputs in order to find errors. The machine learning module 114 may modify the model of data according to the correct outputs to refine the decision making of the machine learning module 114, improving the accuracy of the automated decision making of the machine learning module 114 to provide the correct inputs. During the training phase, the machine learning module 114 may learn the correct outputs by analyzing and describing well known data and information, that may be stored by the knowledge base 110, which may be used as a reference describing data types and attributes. Examples of data modeling may include classification, regression, prediction and gradient boosting. Under a supervised learning technique, the machine learning module 114 may be trained using historical data describing previous files having a metadata, including know data characteristics and attributes, to predict the appropriate categorization of files being analyzed by the analysis module 112.

Unsupervised learning techniques on the other hand may be used when there may be a lack of historical data that may be available to categorize each of the files listed by the analysis module 112. Machine learning that is unsupervised may not be "told" the right answer the way supervised learning algorithms do. Instead, during unsupervised learning, the algorithm may explore the data to find a common structure between the files being explored. Embodiments of an unsupervised learning algorithm can identify common attributes of metadata between each of the files streamed to or stored by the raw data storage 117. Examples of unsupervised machine learning may include self-organizing maps, nearest-neighbor mapping, k-means clustering, and singular value decomposition.

Embodiments of a machine learning 114 module may also incorporate semi-supervised learning techniques in some situations. Semi-supervised learning may be used for the same applications as supervised learning. However, instead of using entirely labelled training examples of data during the training phase, there may be a mix of labelled and unlabeled examples during the training phase. For example, there may be a small or limited amount of labelled data being used as examples (i.e., there may be a small amount of historical data) alongside a larger amount of unlabeled data that may be presented to the machine learning 114 module during the training phase. Suitable types of machine learning techniques that may use semi-supervised learning may include classification, regression and prediction models.

Embodiments of the analytics engine 109 may use the conclusions drawn by the machine learning module 114 based on the knowledge base 110 to recommend or provision one or more operational databases 123 to the data lake system 101. The term "operational database 123" may refer to databases that may store, add, change, delete or update data inside a date lake, data warehouse or other data structure in real time. Embodiments of an operational database 123 may house data that is produced by an enterprise or an organization's day-to-day operations. For example, by storing and managing customer information, inventory, supply-chain information and purchase data. Examples of the types of operational databases 123 that may be provisioned to a data lake may include operational databases 123 implementing database models such as a relational database, key-value stores, document-oriented databases, flat file databases, time-series databases, hierarchical databases, network databases, graph databases, and object-oriented databases. Each operational database 123 may comprise its own database engine 119 and database repository 120, or in some embodiments, the database engine 119 and/or database repository 120 may be shared amongst a plurality of compatible operational databases 123 running on the same or compatible database engines 119.

A database engine 119 may refer to an underlying software component or module that an operational database 123 may use to create, read, update and delete data from database records, which may be stored (for example, as tables) within the database repository 120. Embodiments of the database engine 119 may process the raw data stored as files in the raw data storage 117 upon request for further processing by a user, administrator and/or data scientist operating the data lake system 101. The database engine 119 may extract one or more attributes about the file from the data stored within the file, generate a new database entry (also referred to as a "record") and populate one or more fields of the database entry with the data stored by the file having data extracted.

An operational database may have numerous options for the type of database engines 119 that may be implemented by the data lake system 101. However, certain database models used by a specific type of database engine 119 may be better suited for managing certain file types and categories of data being stored by the data lake system 101 than others. For example, an operational database 123 built using the Cloudant database engine 119 may be document-orientated database that manages JSON files, whereas Db2 is a relational database that may manage JSON, key-value pairs, tabular data and XML files. Other examples of database engines 119 that may be implemented for an operational database 123 may include Aerospike (key-value store that manages key-value pairs), Altibase (relational database, mages tabular data), Apache Cassandra (key-value store, manages key-value pairs), c-treeACE (relational, ISAM and binary records model, manages tabular data, JSON and binary records), IBM Informix (relational, object-relational and dimensional database, manages time series and spatial data), Clusterpoint (document-oriented, manages XML, JSON and text data), Clustrix (relational database, manages tabular data), Couchbase and CouchDB (both document-oriented and manage JSON), FoundationDB and Riak (key-value stores, managing key-value pairs), and MongoDB which is a document oriented database that manages BSON objects. Additional database engines 119 may include EnterpriseDB, Ingres, Microsoft SQL Server, NuoDB, Oracle, SAP HANA and VoltDB which are each relational databases that manage tabular data.

Upon creating a new operational database 123 that is being applied to a data lake, the database engine 119 and database repository 120, may be created and linked to the operational database 123. As actions upon the operational database 123 are requested by a user, administrator or data scientist having access to the operational database 123, the database engine 119 may perform the requested function and subsequently add, change, update and/or delete operational database records accordingly. Moreover, embodiments of the operational database 123 may share information with the knowledge base 110, including information about the type of database engine 119 that has been provisioned to the data lake, performance data of the database engine 119 and the frequency files of each file classification or data type are being accessed using the database engine 119. A new entry in the knowledge base 110 may be created that combines the type of operational database 123 being used with the categorization of the types of files being stored by the data lake system as determined by the analysis module 112, the database engine 119 being used and the performance of said database engine 119, allowing for future predictions and recommendations of operational databases 123 based on the types of files that are being stored by newly created or registered data lakes that may not yet have an operational database 123 selected at the time of creation or registration.

In some embodiments, a data lake system 101 being created or registered may be receiving or storing streaming files that may be identified as a file type or category of data that may be unsuitable for any of the operational databases 123 and/or database engines 119 available to the data lake system 101. Under such a circumstance, the analytics engine 109 may identify, based on the knowledge base 110, that a suitable operational database 123 could not be identified, or that the data lake system 101 may not have an appropriate operational database 123 and/or database engine 119 available to manage the data and files being transmitted to the data lake system 101. Accordingly, in response to the identification of insufficient capabilities of the data lake system 101 to manage the files or data categories, the reporting engine 125 of the data lake system 101 may send a report, notification or error alerting a user or administrator of the data lake system 101 that an operational database 123 or database engine 119 could not be found that matches the management requirements of the file types or data categories being received or stored. In some embodiments, the data lake system 101 may request human input from the user of administrator to resolve the error in identifying a suitable operational database 123 or database engine 119.

Figure 1C:
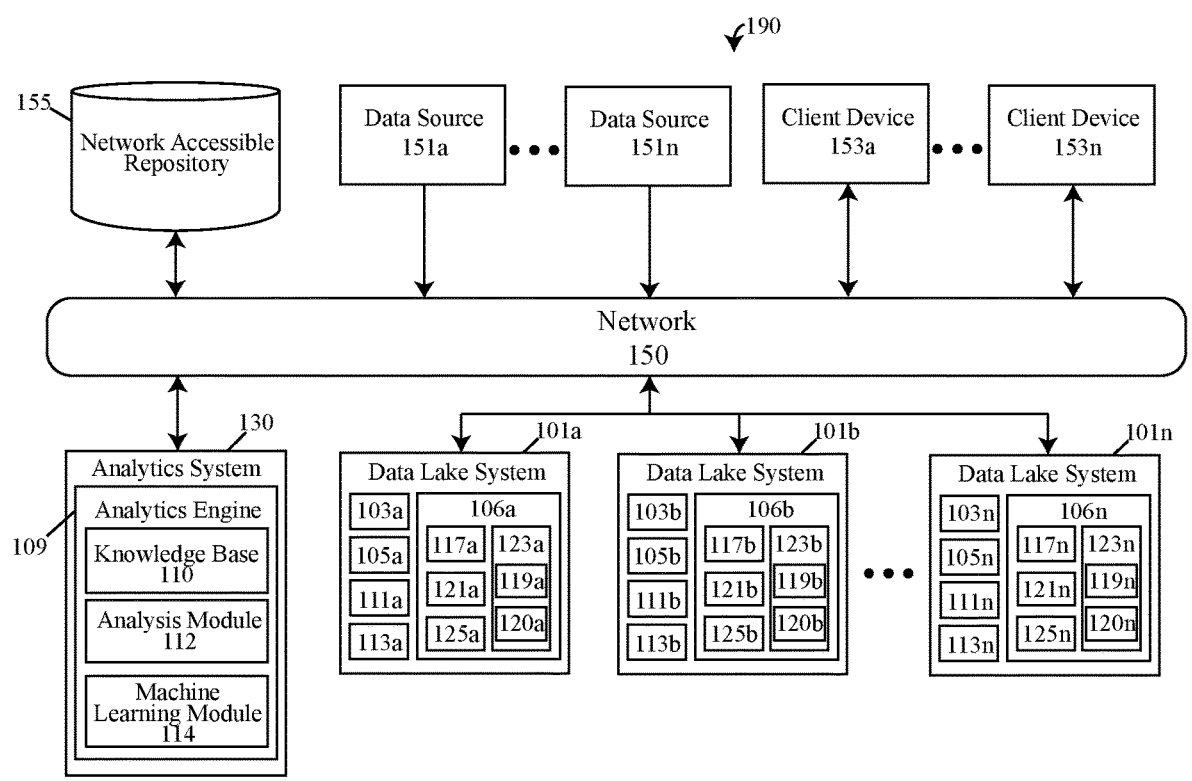
FIG. 1c depicts a functional block diagram describing another alternative embodiment of a computing environment in accordance with the present disclosure.
Figure 2B:
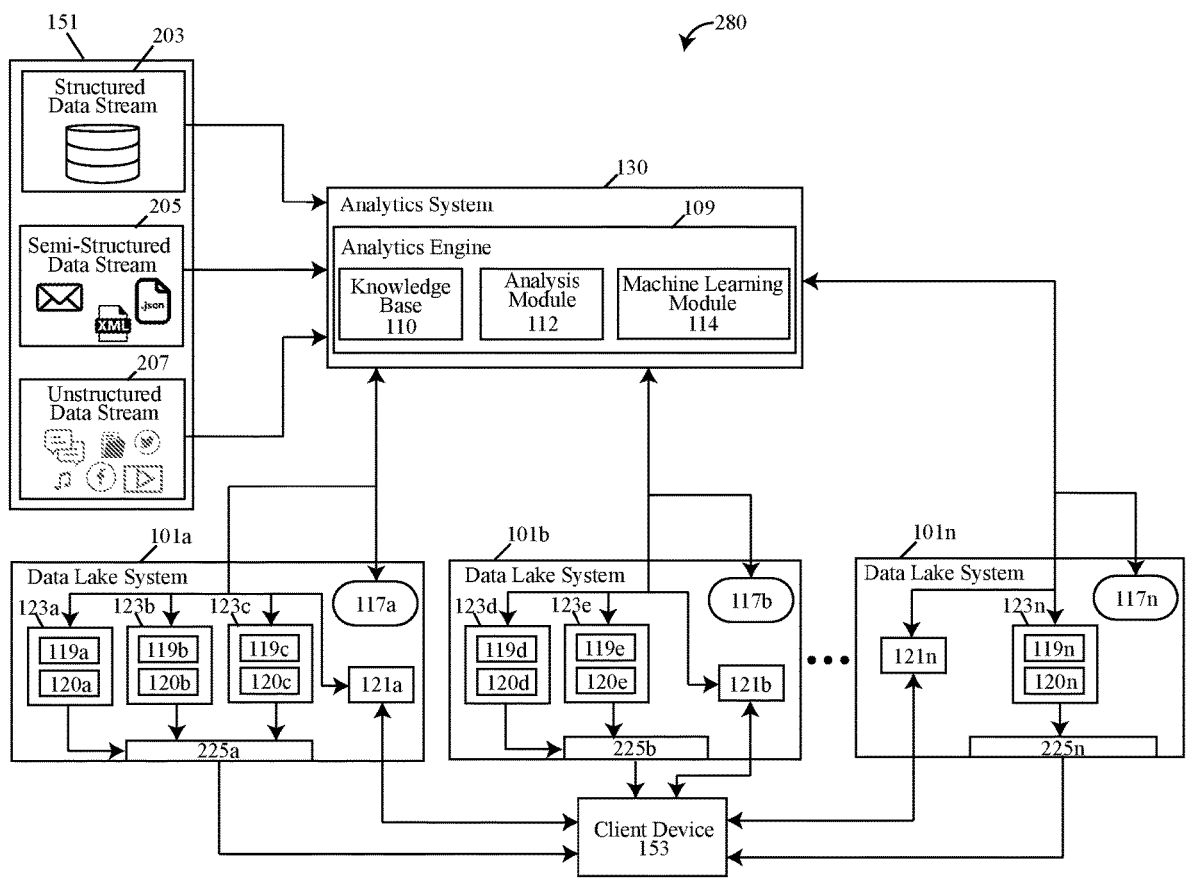
FIG. 2b depicts a functional block diagram describing a workflow for an alternative embodiment of a computer environment, in accordance with the present disclosure.

Embodiments of the data lake system 101 may further comprise a data cataloging & curation 121 service (hereinafter referred to as a "data catalog 121"). A data catalog 121 may provide a method for users of a data lake system 101, or a network of data lake systems (as shown in FIG. 1c and FIG. 2b) to view and understand the types of data available to the user on the data lake system 101 and/or available via one or more data sources 151 streaming data to the data lake system 101. Embodiments of data catalog 121 may organize the data sets of the raw data storage 117 and/or operational database 123 to allow for users to perform self-service searches for specific data, research the lineage of the stored data, uses of the data and the value of the data. Embodiments of the data catalog 121 may be a database instance that has compiled and organized the metadata, including metatags, and separate metadata files of each filed stored by the data lake system, into a searchable index that may be accessible to one or more users connecting to the data lake system 101 via one or more client devices 153.

Embodiments of the data catalog 121 may leverage the functions of the analytics engine 109, including the functions of the analysis module 112 and the machine learning module 114 to automatically populate and update the data catalog 121. For example, each time a new file is streamed to the data lake system 101, the new file may be scanned for metadata by the analysis module 112 and categorized using machine learning techniques of the machine learning module 114 to better understand the types of data accessible to users of the data lake system 101. Users of the data catalog 121, may select files and datasets being stored by the raw data storage 117 and operational database 123 for additional processing, transformation, manipulation and reporting.

Through the use of the data catalog 121, users may submit requests for access to the files and datasets stored by the data lake system 101, as well as request the retrieval of datasets and files that may be stored by one or more data sources 151. FIG. 2a depicts a block diagram that describes the flow of files and datasets from one or more data sources 151 connected to a data lake system 101 to the presentation layer 225 in response to one or more requests from a user interfacing with the data lake system via a client device 153 accessing the data catalog 121. As shown in FIG. 2a, one or more data sources 151 may stream the files to the raw data storage 117, where the files may be analyzed and categorized by the analytics engine 109. Embodiments of the analytics engine 109 may use the analysis engine 112, machine learning 114 and the knowledge base 110 to identify the best operational database 123 to transform and process the incoming data and file. The analytics engine 109 may sort the files being streamed to the operational database 123 (in this example, operational database 123a, 123b or 123n). The analyzed and categorized information may be directed by the analytics engine 109 to the database repository 120 of the chosen operational database 123 for managing the streaming file. Files stored by the raw data storage 117 may be maintained in a native format until a request is received by the operational database chosen to manage the file, wherein upon request, the database engine 119 may further extract the data from the stored files or data sets for further processing as requested by the data catalog 121 service interfacing with a user.

In accordance with the user's request, the requested file or dataset of the raw data storage 117 may be subsequently transformed by extracting one or more attributes of the file or data set via the database engine 119 and entering those attributes into a record or table maintained within the database repository 120. Records of the requested files or datasets may be queried by the user or administrator of the data lake system 101, wherein the information stored by the operational database 123 may be accessed and presented to the user. For example, by loading the requested information from the operational database 123 into the presentation layer 225 of the data lake system 101, thus displaying the requested data on a display 118 of the data lake system 101 and/or a display 118 connected or integrated into a client device 153, which may be viewable via a GUI.

Referring back to the drawings, FIG. 1b depicts an alternative embodiment of the computing environment 100 as computing environment 180. The alternative embodiment of computing environment 180 may differ from computing environment 100 by decentralizing one or more components and systems onto network 150, rather than using a self-contained data lake system 101. For example, as shown in FIG. 1b, the analytics engine 109 may be part of a separate computing system, referred to as the analytics system 130. As shown in the figure, the analysis module 112 and machine learning module 114 may be part of the separate analytics system 130 and may perform the functions of the analytics engine 109 for the data lake system 101 remotely over network 150. While not specifically shown in FIG. 1b, knowledge base 110 may also be part of analytics system 130 as well. However, as shown, the knowledge base 110 may be remotely accessible to the data lake system 101 as well as the analytics engine. Embodiments of the knowledge base 110 can be part of a separate system connected to the network 150, for example a network accessible repository 155 as exemplified in FIG. 1b.

FIG. 1c depicts another alternative embodiment of a computing environment 190, wherein a plurality of separate data lake systems 101a, 101b, 101n are connected to network 150 and have access to one or more data sources 151 and one or more users operating client devices 153. As shown in the embodiment of FIG. 1c, analytics system 130 comprising an analytics engine 109 may be accessible via network 150 and perform analytics functions for each of the plurality of data lake systems 101a, 101b, 101n. Each data lake system 101 may not need to separately rely on a separate knowledge base 110 or analytics engine 109, instead, each data lake system 101 may use a commonly shared knowledge base 110 and/or analytics engine 109. Moreover, the sharing of a knowledge base 110 by a plurality of data lake systems 101 may be particularly advantageous because the increased number of data lake systems 101 may result in a larger number of entries in the knowledge base 110, thus building up the knowledge base 110 quicker and may make the knowledge base 110 more robust and accurate.

The embodiment of FIG. 2b depicts an alternative computing environment 280 describing the flow of streaming files and data from one or more data sources 151 to one or more data lake systems 101a, 101b . . . 101n, each comprising one or more operational databases 123a-123n. In the computing environment 280, instead of files being streamed directly from the data streams 203, 205, 207 to a data lake system 101, each of the streaming files and any accompanying metadata, may be streamed to the analytics system 130. Embodiments of the analytics system 130 may, using the analytics engine 109, analyze the types of files being streamed, categorize the data of the files based on each file's metadata and use machine learning algorithms in conjunction with the knowledge 110 to sort the streaming files received to one or more data lakes identified by the analytics system 130 comprising an operational database 123 that is optimal for storing and processing the data of the streaming files.

Method for Self-learning Operational Database Management

Figure 5A:
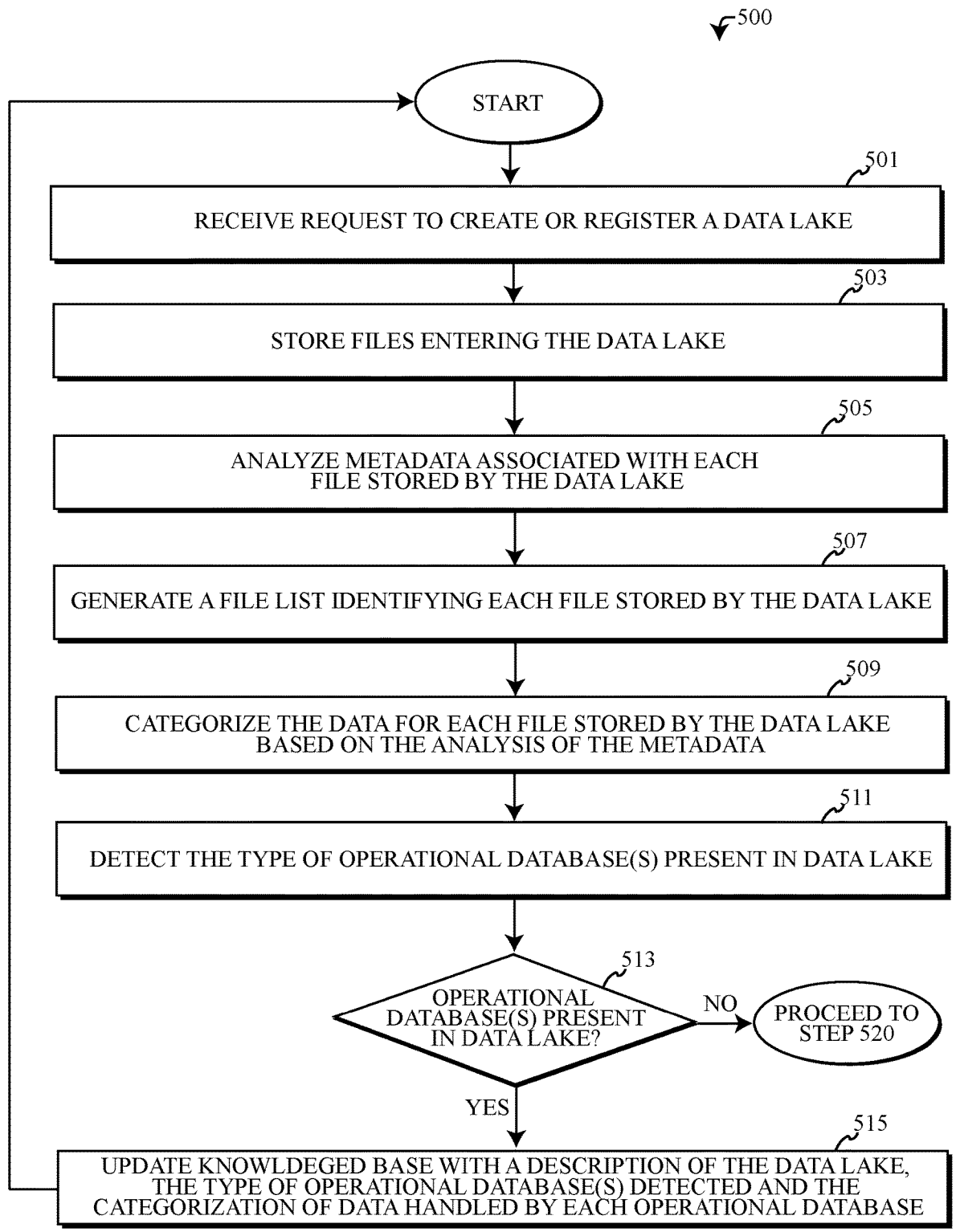
FIG. 5a depicts a flow diagram describing an embodiment of an algorithm executing a computer implemented method in accordance with the present disclosure.
Figure 5B:
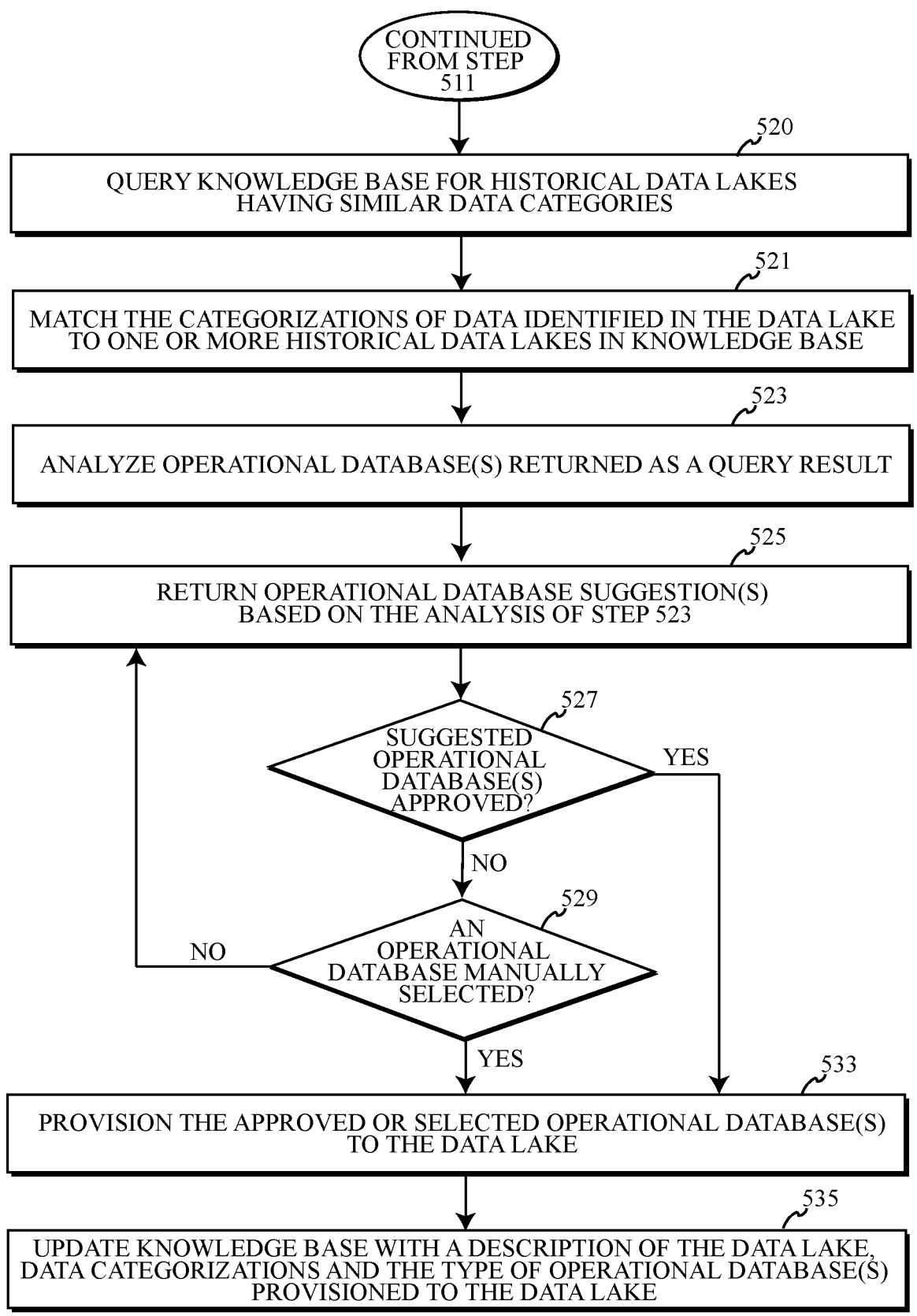

The drawings of FIG. 5a-5b represent embodiments of algorithms for implementing computerized methods for selecting and applying an operational database to a data lake system 101 operating in a computing environment 100, 180, 190, 200, 280 350 as described in FIGS. 1a-4, using one or more computer systems as defined generically by computer system 600 in FIG. 6 below and more specifically by the embodiments of specialized computer systems depicted in FIGS. 1a-4 described herein. A person skilled in the art should recognize that the steps of the method described in FIG. 5a-5c may be performed in a different order than presented and the methods of FIG. 5a-5c may not require all the steps described herein to be performed. Rather, some embodiments may alter the methods by using one or more of the steps discussed below.

FIG. 5a is a flowchart illustrating an algorithm 500 for selecting and/or provisioning an operational database 123 to a data lake, in accordance with the embodiments of the present disclosure. The embodiment of the algorithm 500 may begin at step 501. In step 501, a data lake system 101 may receive a request to create or register a data lake as part of the network 150. Embodiments of the data lake system 101 may accept the data lake creation or registration request and proceed to step 503. In step 503 of the algorithm 500, the data lake system 101 may begin receiving and/or storing one or more streams of incoming files from one or more data streams 203, 205, 207. These streaming files may be originating from one or more data sources 151 connected to network 150. The streaming files may include metadata embedded within the file, or in some instances, a separate metadata file associated with the streaming file may be received by the data lake system 101. In some embodiments of step 503, the incoming files (and metadata files) from the data streams 203, 205, 207 may be stored by the raw data storage 117 system in the native format that each streaming file is received by the data lake system 101. In some embodiments, the files being stored by the raw data storage 117 may be assigned a unique identifier to each of the files as well as one or more metatags, keywords or descriptions that may be applied based on an analysis of the incoming file, the incoming file's metadata or a separate metadata file associated with the incoming file.

In step 505 of algorithm 500, the analysis module 112 of the analytics engine 109 may analyze and parse through the metadata of each incoming file (whether embedded within the file itself or associated with the file as a separate metadata file). Examples of metadata may include descriptions or attributes about the incoming file (file type, author, date created, length, resolution, file size, etc.) metatags or keywords identifying themes of the file or words that may be referenced by the document repeatedly throughout, timestamps, file structures and other evidence that may help identify a type of file or category the file may be classified as, without having to fully process or extract the data from the file. The analysis module 112 may annotate or tag files with keywords or descriptors which may be used by the machine learning module 114 to categorize the file data or file type.

In step 507 of algorithm 500, a file list may be generated by the analytics engine 109 which may describe one or more of the files being stored by the raw data storage 117 of the data lake system 101. In the exemplary embodiment of the present disclosure, the generation of the file list may be created by the analysis module 112 of the analytics engine 109. Embodiments of the file list may identify each file by the unique identifier assigned when the files are stored in the raw data storage 117 or by the file name of the incoming file. Embodiments of the file list being generated may be continuously updated and amended in real-time or via batch processing, as new files are continuously streamed from one or more data sources 151 and stored by the raw data storage 117 of the data lake system 101. Each file listed within the file list generated by the analytics engine 109, may be described or summarized based on the analysis of the metadata in step 505.

In step 509, the machine learning module 114 may proceed to categorize the data maintained by each of the files of the file list that have been analyzed by the analysis module 112 during step 505 of algorithm 500. The metadata may be processed by the machine learning module 114 using one or more machine learning models to draw conclusions and inferences about the files and file data that may be present in the files being analyzed, based on historical files and data described in knowledge base 110 that has exhibited similar characteristics to the metadata discovered by the analysis module 112. The conclusions drawn by the machine learning module 114 describing the categorization of data stored by each file of the file list generated in step 507 may be shared with the analysis module 112 and/or edited by the analytics engine 109 to accurately reflect the conclusions drawn by the machine learning module 114.

In step 511, the analytics engine 109 may attempt to detect which type of operational databases 123 (if any) are currently present in the data lake seeking to be created or registered. Embodiments of the analytics engine 109 may detect the presence of the operational database by identifying whether one or more database engines 119 have been linked to the data lake. The type and kind of database engine 119 identified by the analytics engine 109 may provide evidence whether an operational database 123 is currently active, as well as inform the analytics engine 109 regarding the types or kinds of files and data the operational databases 123 may be capable of processing. Based on the detection performed in step 511, in step 513 a determination is made whether one or more operational databases 123 are currently present. If an operational database 123 is present in the data lake, the analytics engine 109 may update the knowledge base 110 with a description of the data lake, the type of operational database(s) 123 detected and the categorization of the data handled by each of the operational database(s) 123. Otherwise, if one or more operational databases 123 are not detected in step 511, the algorithm 500 may proceed to step 520.

Continuing from step 513, upon determining that an operational database 123 has not been provisioned to the data lake, the algorithm 500 may proceed in step 520, wherein the analytics engine 109 may query the knowledge base 110 for one or more historical records of data lakes managing similar file types, data categories and metadata as the data lake seeking creation or registration. The historical records may describe the operational databases 123 used for managing the data of the historical data lake (i.e., data lakes that may have contributed to the knowledge base 110) and any operational performance information about the database engine(s) 119 used by the operational database 123 which may manage the same types of files and data of the current data lake being created or registered. The facts database of the knowledge base 110 may analyze the current environment of the current data lake. For instance, the facts database may retrieve the file list generated by the analysis module 112 in step 507, including the categorization of data determined by the machine learning module 114 in step 509. The query made by the knowledge base 110 may be targeted toward retrieving records of historical data lakes that may have one or more categorizations of data that match the current categorizations of data described in the file list of the current data lake being created or registered.

In step 521 of the algorithm 500, upon receiving the search results of the query of step 520, the knowledge base 110 may match the data types and categorizations in the file list generated by the analysis module 112 and machine learning module 114 to the historical data lake records maintained by the knowledge base 110. The matching process may comprise the steps of analyzing one or more rules of the rules engine to determine which rules may be applicable for the specific query being requested. The knowledge base 110 may select one or more rules that fit the query and apply the rules using the logic programmed by the reasoning engine to retrieve records that match at least one data types or data categorizations in common from the record of data lakes to the current data lake having the same of similar data categorizations.

In step 523, the reasoning engine of the knowledge base 110 may analyze the query result returned that has one or more matching data types or categorization as determined in step 521. Using a combination of the rules from the rules engine and the logic of the reasoning engine, the knowledge base 110 may determine and rank the records of the historical data lakes provisioned with an operational database 123 based on the records that most closely match the data types and data categorizations of the files of the current data lake being created or registered. Moreover, the reasoning engine of the knowledge base 110 may further analyze any operational performance data for each database engine 119 of the operational databases returning as a result of the query and ranking the performance data based on the how well each of the database engines may manage the type of data and files being managed by the current data lake being created or registered. Additionally, the reasoning engine of the knowledge base 110 may further analyze how often the database engines 119 of the historical data lake access or process data having a similar category of data to the current data lakes being created or registered. Embodiments of the knowledge base 110 may further utilize the justification engine to reinforce the decision making of the knowledge base's 110 selections for the most closely matching records of past data lakes.

As a result of performing step 523, the knowledge base 110 may conclude that one or more particular operational databases 123 linked to specified database engines 119 to manage a particular categorization of data, most closely matches the categorization of data being stored and received by the current data lake being created or registered. For example, the justification engine may determine that exactly the same categories of data and file types were managed in the past by a particular historical data lake recorded in the knowledge base 110, that the database engine 110 of the past historical data lake offers the best operational performance, that the historical data lake has frequently managed the same categories of data and data types, and therefore it could be expected that applying the same operational database 123 with the same database engine 119, would be appropriate to yield a similar outcome as the past historical data lake records suggest.

Embodiments of the reasoning engine may rank the records of the past data lakes based upon how closely the categorization of data matches with the current data lake, the expected performance of the database engine 119 and/or the frequency of using the categorized data identified in step 509. For example, ranking past data lake records that have at least a 95% rating corresponding to the assessment of the data categorizations, performance and/or frequency of use higher than records with at least a 90% rating, at least 85% rating or at least 75% rating. The justification engine may, based on the reasoning engine and the rules, determine that the operational database 123 selected by the most closely categorized data lakes with the highest performance and/or similar frequency of used of the data types of the current data lake, may be reasonably expected to be acceptable for managing the data being stored by the current data lake being created or registered and therefore select the operational database 123 that most closely fits the needs of the current data lake being registered or created.

While the "most closely matched" could be selected based on the historical data lakes that were previously provisioned having the highest ranking or closest number of the same or similar types of data, i.e. at least 95%, at least 90%, at least 85%, at least 75%, at least 50%, when compared with other previously registered data lakes, in alternative embodiments, the knowledge base 110 may use a statistical analysis of the different types of data being stored by or streamed to the current data lake being created or registered. The statistical analysis of the different types of data or data categorizations may be compared to the types of data being stored with historically provisioned data lakes, in order to calculate at a level of confidence (confidence interval) that one of the historically provisioned data lakes, more likely than not, has been provisioned with one or more operational databases 123 that successfully managed or organized the same categories of data stored and/or streamed to the newly registered data lake. For example, the most closely matched historical data lake may be considered the closest match within a 99% confidence interval (CI), a 95% CI, 90% CI, 85% CI, 75% CI, etc. The knowledge base 110 may select the operational database(s) 123 corresponding to the historical data lake with the closest match based on having highest confidence interval.

In step 525, upon selecting an operational database 123 that may most closely match the current data lake to one or more historically registered data lakes, knowledge base 110 may report the selection to the analytics engine 109 and return operational database suggestion(s) and/or database engine 119 suggestion(s) based on the analysis of step 525. Embodiments of the data lake system 101 may, in some embodiments, automatically provision the operational database(s) 123 based upon the recommendations returned by the analytics engine 109 and/or the knowledge base 110. An automated data lake system may proceed from step 525 to step 533 of the algorithm 500 without first seeking approvals from a user or administrator of the data lake system 101. However, in alternative embodiments of the reporting engine 125 may receive the operational database 123 suggestion from the analytics engine 109 and/or knowledge base 110 and may present and/or display a notification of the recommendation to the user or administrator for approval. For example, by displaying a message prompt on a GUI that allows for the user to accept or decline the recommendation.

In step 527 a determination may be made whether or not the operational database 123 suggestion(s) returned to the user or administrator of the data lake system has been approved. If an approval is received by the data lake system 101, the method may proceed to step 533, wherein the data lake system 101 may proceed to provision one or more approved operational databases 123 to the data lake. However, if in step 527, the data lake system 101 does not receive approval to provision the recommended operational database(s) 123 to the data lake, a second determination may be made in step 529 to determine whether or not one or more operational database(s) 123 have been manually selected by a user or administrator of the data lake system 101. If, in step 529, a determination is made that an operational database 123 has been manually selected, the algorithm 500 may proceed to step 533, wherein the data lake system 101 may proceed to provision data lake system 101 with the operational database(s) 123 manually selected by the user and/or administrator of the data lake system.

Conversely, if in step 529, an operational database 123 has neither been selected manually nor has the suggested operational database 123 been approved for provisioning, the method may proceed to back to step 525, wherein the data lake system 101 may return different operational database suggestion(s) via the reporting engine 125 of the data lake system 101 for approval.

Once an operational database 123 has been approved or selected and the operational database(s) 123 has been provisioned to the data lake system 101, the reporting engine 125 may communicate the results of the provisioning of the operational database 123 to the analytics engine 109 and/or the knowledge base 110, as well as the user and/or administrator of the data lake system. In step 535 of the algorithm 500, the analytics engine 109 may update the knowledge base 110 by adding a new record or updating an existing record for the data lake system 101 that was most recently provisioned. The record being added or updated to the knowledge base 110 may describe the data lake, file types, the categorizations of data being stored by the data lake system, the type of operational database 123 ultimately provisioned to the data lake system 101 in step 533 and the database engine 119 implemented. The newly added or updated record may subsequently be queried and utilized by subsequent data lakes systems 101 being created or seeking registration when implementing algorithm 500 to make a determination of which operational database may be provisioned thereto.

Figure 5C:
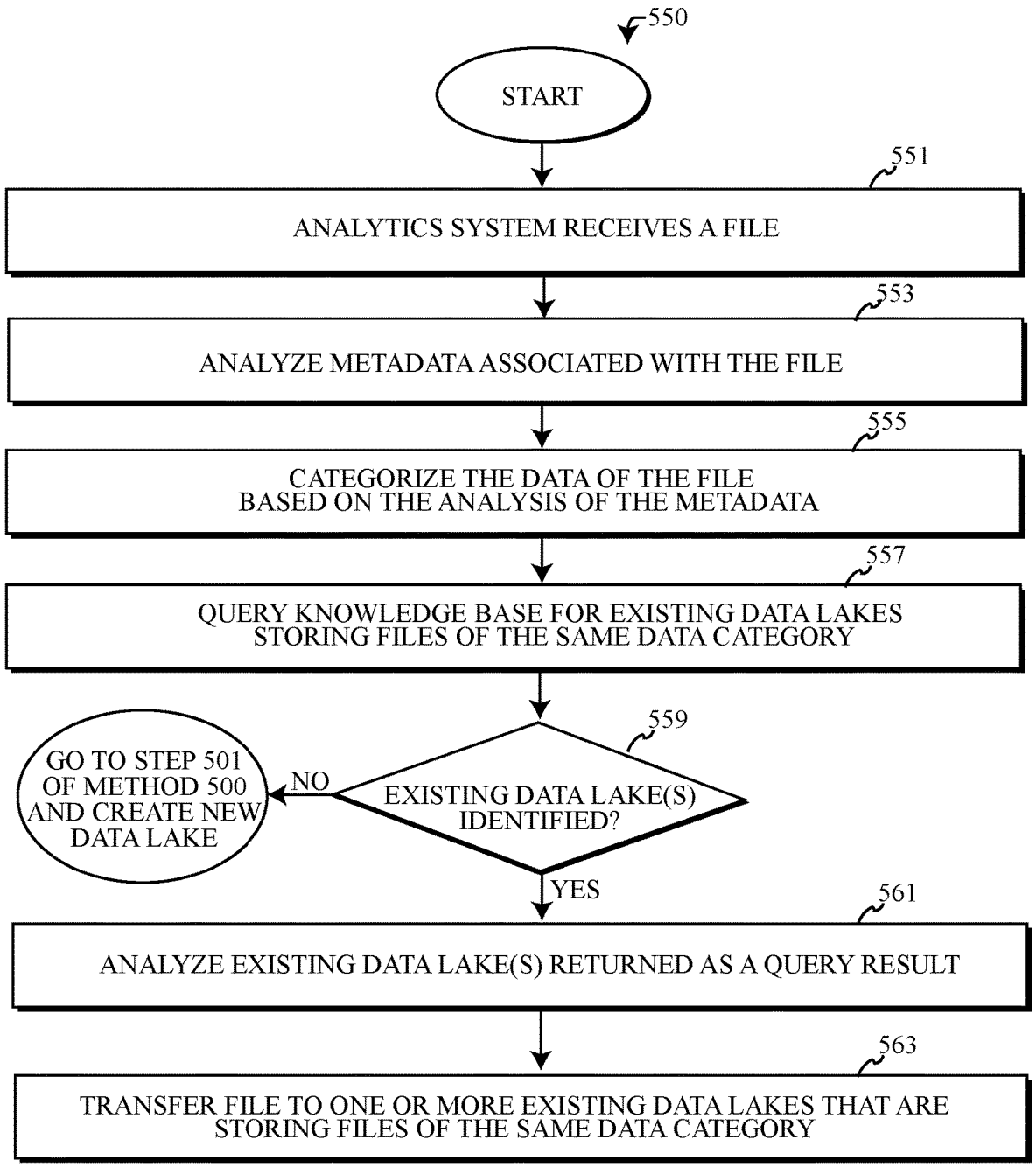
FIG. 5c depicts a flow diagram describing an alternative embodiment of an algorithm executing a computer implemented method in accordance with the present disclosure.

Referring to the drawing, FIG. 5c, depicts an algorithm 550 implementing a computerized method for sorting and transferring one or more streaming files to one or more data lake systems 101 comprising at least one operational database 123 that may be best suited for the purpose of managing the streaming file. Algorithm 550 may begin at step 551, wherein an analytics system 130 may receive a file being streamed from one or more data sources 151 to the analytics system 130 via network 150, along with any separate metadata files that may be associated with the streaming file. In step 553, the analytics engine 109 may analyze the files being streamed to the analytics system 130 for metadata associated with each file and/or separate metadata files.

In step 555, the analytics engine 109, may categorized the data of each file based on the characteristics of the metadata, including the file type, metatags, keywords and descriptions of the file that may be identified during the analysis of step 553. The analytics engine 109 may query the knowledge base 110 in order to identify which existing data lakes on the network 150 that may be capable of managing the file being streamed to the analytics system 130. The query may match the categorizations of the files based on the metadata with the categorizations of data known to be managed by the existing data lake systems 101. In step 559, a determination may be made, based on the query result whether or not one or more existing data lake systems are identified to be capable of managing the file. If, no matching data lake systems are returned in the query results, a new data lake may be created by requesting the creation of a new data lake. Accordingly, the algorithm 550 may proceed to step 501 of method 500 described above. Conversely, if one or more existing data lake systems 101 capable of managing the file being received are identified, the algorithm 500 may proceed to step 561.

In step 561, the analytics engine 109 may proceed to analyze the existing data lake systems 101 returned as a query result by the knowledge base 110. The analytics engine 109 may compare the types of files and data known to be stored by each of the existing data lake systems 101, the database engines 119 utilized by each operational database 123 of the data lake systems 101, the operational performance of each database engine 119 when managing files and data that matches the same category as the file being received and the frequency with which each of the existing data lake systems 101 accesses and manage the same file type or data category as the file being received. Based on this analysis, the analytics engine 109 may select a data lake(s) 101 determined to most optimally store and manage the file with the best suited operational database 123. Accordingly, in step 563, the analytics system 130 may transfer the file and/or copies thereof to one or more data lake systems 101 suitable for storing files having the same data category and determined in step 561 to optimally manage the file.

Computer System

FIG. 6 is a block diagram of internal and external components of a computer system 600, which may be representative of the one or more computer systems depicted in the computing environment 100, 180, 190, 200, 280, 350 as shown in FIGS. 1a-4, in accordance with the embodiments of the present disclosure. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 may include communications fabric 602, which provides for communications between one or more processors 103, memory 105, persistent storage 106, communication unit 111, and one or more input/output (I/O) interfaces 113. Communications fabric 602 can be implemented with any architecture designed for passing data and/or control information between processors 103 (such as microprocessors, communications and network processors, etc.), system memory 105, external devices 116, and any other hardware components within a system. For example, communications fabric 602 can be implemented with one or more buses.

Memory 105 and persistent storage 106 may be computer-readable storage media. Embodiments of memory 105 may include random access memory (RAM) 107 and cache memory 108. In general, memory 105 can include any suitable volatile or non-volatile computer-readable storage media. Software, such as a program 621 may be stored in persistent storage 106 for execution and/or access by one or more of the respective processors 103 via one or more devices of memory 105. Such software programs 621 can include a database engine 119, data cataloging & curation 121, an operational data store 123, a knowledge base 110, an analysis module 112, machine learning module 114 and a reporting engine 125.

Persistent storage 106 may include, for example, a plurality of magnetic hard disk drives. Alternatively, or in addition to magnetic hard disk drives, persistent storage 106 can include one or more solid state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communication unit 111 provides for communications with other computer systems or devices via a network (e.g., network 150). In this exemplary embodiment, communication unit 111 may include network adapters or interfaces such as a TCP/IP adapter cards, wireless Wi-Fi interface cards, 3G, 4G, or 5G wireless interface cards or other wired or wireless communication links. The network 150 can comprise, for example, copper wires, optical fibers, wireless transmission, routers, firewalls, switches, gateway computers and/or edge servers. Software and data used to practice embodiments of the present invention can be downloaded to each of the computer systems operating in computing environment 100, 180, 190, 200, 350 or computer system 600 through communication unit 111 (e.g., via the Internet, a local area network or other wide area network). From communication unit 111, the software and data can be loaded onto persistent storage 106.

One or more I/O interfaces 113 may allow for input and output of data with other devices that may be connected to computer system 600. For example, I/O interface 113 can provide a connection to one or more external devices 116 such as at least one sensor device, keyboard, computer mouse, touch screen, virtual keyboard, touch pad, pointing device, or other human interface devices. External devices 116 can also include portable computer-readable storage media such as, for example, thumb drives, portable optical or magnetic disks, and memory cards. I/O interface 113 may also connect to display 118. Display 118 provides a mechanism to display data to a user and can be, for example, a computer monitor or screen. Display 118 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:
    categorizing a streaming file ingested by a data lake based on a metadata of the streaming file;
    associating an operational database with the data lake based on the categorized streaming file; and
    creating an entry in a knowledge base comprising a description of the data lake, the operational database associated with the data lake and the categorized streaming file.

2. The method of claim 1, wherein the metadata of the streaming file is a separate file.

3. The method of claim 1, wherein the operational database associated with the data lake is suggested based on the knowledge base.

4. The method of claim 1, wherein the streaming file comprises unstructured data.

5. The method of claim 4, further comprising the step of: transforming the unstructured data into structured data.

6. The method of claim 1, wherein the streaming file comprises measurement data of a sensor device.

7. The method of claim 1, further comprising the step of: analyzing the streaming file for frequency of usage.

8. A computer system comprising:
    a processor; and
    a computer-readable storage media coupled to a processor, wherein the computer readable storage media contains program instructions executing a computer-implemented method comprising the steps of:
        categorizing a streaming file ingested by a data lake based on a metadata of the streaming file;
        associating an operational database with the data lake based on the categorized streaming file; and
        creating an entry in a knowledge base comprising a description of the data lake, the operational database associated with the data lake and the categorized streaming file.

9. The computer system of claim 8, wherein the metadata of the streaming file is a separate file.

10. The computer system of claim 8, wherein the operational database associated with the data lake is suggested based on the knowledge base.

11. The computer system of claim 8 wherein the streaming file comprises unstructured data.

12. The computer system of claim 11, further comprising the steps of:
transforming the unstructured data into structured data.

13. The computer system of claim 8, wherein the streaming comprises measurement data of a sensor device.

14. The computer system of claim 8, further comprising the step of:
Analyzing the streaming file for frequency of usage.

15. A computer program product comprising:
one or more computer readable storage media having computer-readable program instructions stored on the one or more computer readable storage media, said program instructions executes a computer-implemented method comprising the steps of:
categorizing a streaming file ingested by a data lake based on metadata of the streaming file;
associating an operational database with the data lake based on the categorized streaming file; and
creating an entry in a knowledge base comprising a description of the data lake, the operational database associated with the data lake and the categorized streaming file.

16. The computer program product of claim 15, wherein the metadata of the streaming file is a separate file.

17. The computer program product of claim 15, wherein the operational database associated with the data lake is suggested based on the knowledge base.

18. The computer program product of claim 15, wherein the streaming file entering the new data lake comprises unstructured data.

19. The computer program product of claim 18, further comprising the step of: transforming the unstructured data into structured data.

20. The computer program product of claim 16, wherein the streaming file comprises measurement data of a sensor device.

* * * * *